United States Patent
Pervan et al.

(10) Patent No.: US 8,431,054 B2
(45) Date of Patent: *Apr. 30, 2013

(54) FIBRE BASED PANELS WITH A WEAR RESISTANCE SURFACE

(75) Inventors: Darko Pervan, Viken (SE); Kent Lindgren, Perstorp (SE); Eddy Boucké, Kortrijk (BE); Jan Jacobsson, Landskrona (SE); Niclas Håkansson, Viken (SE); Göran Ziegler, Viken (SE)

(73) Assignee: Ceraloc Innovation Belgium BVBA, Brussels (BE)

( * ) Notice: Subject to any disclaimer, the term of this patent is extended or adjusted under 35 U.S.C. 154(b) by 288 days.

This patent is subject to a terminal disclaimer.

(21) Appl. No.: 12/743,423

(22) PCT Filed: Nov. 13, 2008

(86) PCT No.: PCT/EP2008/065489
§ 371 (c)(1),
(2), (4) Date: Aug. 12, 2010

(87) PCT Pub. No.: WO2009/065769
PCT Pub. Date: May 28, 2009

(65) Prior Publication Data
US 2010/0300030 A1    Dec. 2, 2010

Related U.S. Application Data

(60) Provisional application No. 60/996,473, filed on Nov. 19, 2007, provisional application No. 61/042,938, filed on Apr. 7, 2008.

(30) Foreign Application Priority Data

Nov. 19, 2007 (SE) .................. 0702555-4
Apr. 7, 2008 (SE) .................. 0800776-7

(51) Int. Cl.
*B27N 3/00* (2006.01)
(52) U.S. Cl.
USPC .................. 264/112; 264/109; 264/122
(58) Field of Classification Search ............... 264/109, 264/112, 122
See application file for complete search history.

(56) References Cited

U.S. PATENT DOCUMENTS 2,962,081 A  11/1960 Dobry et al.
3,032,820 A  5/1962 Johnson
(Continued)

FOREIGN PATENT DOCUMENTS
AU  80284/75  6/1975
CH  298894 A  5/1954
(Continued)

OTHER PUBLICATIONS

Lining Plate For Building Interiors, Mar. 25, 2004, machine translation of DE20214532.*

(Continued)

*Primary Examiner* — Mary F Theisen
(74) *Attorney, Agent, or Firm* — Buchanan Ingersoll & Rooney PC

(57) ABSTRACT

Building panels with a homogenous decorative surface having a wear layer including fibers, binders and wear resistant particles.

23 Claims, 17 Drawing Sheets

U.S. PATENT DOCUMENTS

| | | | |
|---|---|---|---|
| 3,135,643 | A | 6/1964 | Michl |
| 3,308,013 | A | 3/1967 | Bryant |
| 3,345,234 | A | 10/1967 | Jecker et al. |
| 3,426,730 | A | 2/1969 | Lawson et al. |
| 3,486,484 | A | 12/1969 | Bullough |
| 3,673,020 | A | 6/1972 | De Jaeger |
| 3,846,219 | A | 11/1974 | Kunz |
| 3,897,185 | A | 7/1975 | Beyer |
| 3,914,359 | A | 10/1975 | Bevan |
| 4,093,766 | A | 6/1978 | Scher et al. |
| 4,131,705 | A | 12/1978 | Kubinsky |
| 4,313,857 | A | 2/1982 | Blount |
| 4,337,290 | A | 6/1982 | Kelly et al. |
| 4,430,375 | A | 2/1984 | Scher et al. |
| 5,034,272 | A | 7/1991 | Lindgren et al. |
| 5,246,765 | A | 9/1993 | Lussi et al. |
| 5,258,216 | A | 11/1993 | Von Bonin et al. |
| 5,422,170 | A | 6/1995 | Iwata et al. |
| 5,543,193 | A | 8/1996 | Tesch |
| 5,569,424 | A | 10/1996 | Amour |
| 5,601,930 | A | 2/1997 | Mehta et al. |
| 5,604,025 | A | 2/1997 | Tesch |
| 5,855,832 | A | 1/1999 | Clausi |
| 5,925,296 | A | 7/1999 | Leese |
| 5,942,072 | A | 8/1999 | McKinnon |
| 6,103,377 | A | 8/2000 | Clausi |
| 6,468,645 | B1 | 10/2002 | Clausi |
| 6,773,799 | B1 | 8/2004 | Persson et al. |
| 6,803,110 | B2 | 10/2004 | Drees et al. |
| 7,022,756 | B2 | 4/2006 | Singer |
| 7,811,489 | B2 | 10/2010 | Pervan |
| 2001/0009309 | A1 | 7/2001 | Taguchi et al. |
| 2002/0100231 | A1 | 8/2002 | Miller |
| 2003/0056873 | A1 | 3/2003 | Nakos et al. |
| 2004/0191547 | A1 | 9/2004 | Oldorff |
| 2004/0202857 | A1 | 10/2004 | Singer |
| 2004/0206036 | A1 | 10/2004 | Pervan |
| 2004/0237436 | A1 | 12/2004 | Zuber et al. |
| 2005/0079780 | A1 | 4/2005 | Rowe et al. |
| 2005/0252130 | A1 | 11/2005 | Martensson |
| 2006/0024465 | A1 | 2/2006 | Briere |
| 2006/0032175 | A1 | 2/2006 | Chen et al. |
| 2006/0070321 | A1 | 4/2006 | Au |
| 2006/0145384 | A1 | 7/2006 | Singer |
| 2006/0183853 | A1 | 8/2006 | Sczepan |
| 2007/0166516 | A1 | 7/2007 | Kim et al. |
| 2007/0184244 | A1 | 8/2007 | Doehring |
| 2007/0207296 | A1 | 9/2007 | Eisermann |
| 2007/0218260 | A1 | 9/2007 | Miclo et al. |
| 2007/0224438 | A1 | 9/2007 | Van Benthem et al. |
| 2008/0000417 | A1 | 1/2008 | Pervan et al. |
| 2008/0032120 | A1 | 2/2008 | Braun |
| 2008/0090032 | A1 | 4/2008 | Perrin et al. |
| 2008/0263985 | A1 | 10/2008 | Hasch et al. |
| 2009/0124704 | A1 | 5/2009 | Jenkins |
| 2009/0145066 | A1 | 6/2009 | Pervan et al. |
| 2009/0155612 | A1 | 6/2009 | Pervan et al. |
| 2009/0208646 | A1 | 8/2009 | Kreuder et al. |
| 2010/0092731 | A1 | 4/2010 | Pervan et al. |
| 2010/0223881 | A1 | 9/2010 | Kalwa |
| 2010/0291397 | A1 | 11/2010 | Pervan et al. |
| 2010/0319282 | A1 | 12/2010 | Ruland |
| 2010/0323187 | A1 | 12/2010 | Kalwa |
| 2010/0330376 | A1 | 12/2010 | Trksak |
| 2011/0175251 | A1 | 7/2011 | Ziegler et al. |
| 2011/0177319 | A1 | 7/2011 | Ziegler et al. |
| 2011/0177354 | A1 | 7/2011 | Ziegler et al. |
| 2011/0189448 | A1 | 8/2011 | Lindgren et al. |
| 2011/0247748 | A1 | 10/2011 | Pervan et al. |
| 2011/0250404 | A1 | 10/2011 | Pervan et al. |
| 2011/0293906 | A1 | 12/2011 | Jacobsson |

FOREIGN PATENT DOCUMENTS

| | | |
|---|---|---|
| CH | 298 894 | 8/1954 |
| DE | 1 815 312 A1 | 7/1969 |
| DE | 7148789 | 4/1972 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 202 14 532 U1 | 2/2004 |
| DE | 202 14 532 U1 | 3/2004 |
| DE | 20214532 U1 * | 3/2004 |
| DE | 103 31 657 A1 | 2/2005 |
| DE | 20 2004 003 061 U1 | 7/2005 |
| DE | 20 2006 007 797 U1 | 8/2006 |
| DE | 20 2006 007 797 U1 | 9/2006 |
| DE | 10 2005 046 264 A1 | 4/2007 |
| DE | 10 2006 024 593 A1 | 12/2007 |
| EP | 0 129 430 A2 | 12/1984 |
| EP | 0 129 430 B1 | 1/1990 |
| EP | 0 355 829 A2 | 2/1990 |
| EP | 0 592 013 A2 | 4/1994 |
| EP | 0 611 408 B1 | 9/1996 |
| EP | 0 744 477 A2 | 11/1996 |
| EP | 0 914 914 A2 | 5/1999 |
| EP | 0 744 477 B1 | 1/2000 |
| EP | 1 193 288 A1 | 4/2002 |
| EP | 1 209 199 A1 | 5/2002 |
| EP | 1 249 322 A1 | 10/2002 |
| EP | 1 454 763 A2 | 9/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 847 385 A1 | 10/2007 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 226 201 A1 | 9/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| FR | 2 873 953 A1 | 2/2006 |
| GB | 984 170 A | 2/1965 |
| GB | 1090450 | 11/1967 |
| JP | 2-229002 A | 9/1990 |
| JP | 11-291203 A | 10/1999 |
| JP | 2001-287208 A | 10/2001 |
| JP | 2003-311717 A | 11/2003 |
| JP | 2003-311718 A | 11/2003 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 01/48333 A1 | 7/2001 |
| WO | WO 01/64408 A1 | 9/2001 |
| WO | WO 01/92037 A2 | 12/2001 |
| WO | WO 02/42167 A2 | 5/2002 |
| WO | WO 03/078761 A1 | 9/2003 |
| WO | WO 03/095202 | 11/2003 |
| WO | WO 2004/042168 A1 | 5/2004 |
| WO | WO 2005/054600 A1 | 6/2005 |
| WO | WO 2006/007413 A1 | 1/2006 |
| WO | WO 2006/013469 A1 | 2/2006 |
| WO | WO 2006/043893 A1 | 4/2006 |
| WO | WO 2009/065768 A1 | 5/2009 |
| WO | WO 2009/065769 A2 | 5/2009 |
| WO | WO 2009/124704 A1 | 10/2009 |

OTHER PUBLICATIONS

Ziegler, Göran, et al., U.S. Appl. No. 61/474,485, entitled "Pre Treated Powder," filed in the U.S. Patent and Trademark Office on Apr. 12, 2011.
Håkansson, Niclas, et al., U.S. Appl. No. 61/474,498, entitled "Powder Based Balancing Layer," filed in the U. S. Patent and Trademark Office on Apr. 12, 2011.
Pervan, Darko, et al., U.S. Appl. No. 13/084,955, entitled "Powder Overlay," filed in the U.S. Patent and Trademark Office on Apr. 12, 2011.
Pervan, Darko, et al., U.S. Appl. No. 13/084,974, entitled "Digitally Injected Designs in Powder Surfaces," filed in the U.S. Patent and Trademark Office on Apr. 12, 2011.
Persson, Hans, et al., U.S. Appl. No. 61/557,643, entitled "Scattering", filed in the U.S. Patent and Trademark Office on Nov. 9, 2011.
Håkansson, Niclas, et al., U.S. Appl. No. 61/557,734, entitled "Powder Based Balancing Layer" filed in the U.S. Patent and Trademark Office on Nov. 9, 2011.
Pervan, et al., U.S. Appl. No. 12/741,998, entitled "Recycling of Laminate Floorings," filed May 7, 2010.
Ziegler, et al., U.S. Appl. No. 61/295,514, entitled "Fibre Based Panels With a Decorative Wear Resistance Surface," filed Jan. 15, 2010.
Ziegler, et al., U.S. Appl. No. 61/295,343, entitled "Bright Coloured Surface Layer," filed Jan. 15, 2010.
Ziegler, et al., U.S. Appl. No. 61/295,520, entitled "Heat and Pressure Treated Design," filed Jan. 15, 2010.
Lindgren, et al., U.S. Appl. No. 61/295,350, entitled "Fibre Based Panels With a Decorative Wear Resistance Surface," filed Jan. 15, 2010.
Ziegler, U.S. Appl. No. 61/323,463, entitled "Powder Overlay," filed Apr. 13, 2010.
Pervan, et al., U.S. Appl. No. 61/323,573, entitled "Fibre Based Panels With a Decorative Wear Resistance Surface," filed Apr. 13, 2010.
Jacobsson, U.S. Appl. No. 61/349,950, entitled "Production Method," filed May 31, 2010.
Persson, Hans, et al., U.S. Appl. No. 61/485,930, entitled "Scattering," filed in the U.S. Patent and Trademark Office on May 13, 2011.
Jacobsson, Jan, U.S. Appl. No. 13/118,846, entitled "Production Method," filed in the U.S. Patent and Trademark Office on May 31, 2011.
Floor Daily, "Shaw Laminates: Green by Design," Aug. 13, 2007, 1 pg, Dalton, GA.
Parquet International, "Digital Printing is still an expensive process," Mar. 2008, cover page/pp. 78-79, www.parkettmagazin.com.
Ziegler, Goran et al. U.S. Appl. No. 12/976,213, entitled "Heat and Pressure Generated Design," filed in the U. S. Patent and Trademark Office on Dec. 22, 2010.
Ziegler, Goran et al. U.S. Appl. No. 12/976,329, entitled "Bright Coloured Surface Layer," filed in the U. S. Patent and Trademark Office on Dec. 22, 2010.
Ziegler, Goran et al. U.S. Appl. No. 12/976,350, entitled "Fibre Based Panels with a Decorative Wear Resistance Surface," filed in the U. S. Patent and Trademark Office on Dec. 22, 2010.
Lindgren, Kent et al. U.S. Appl. No. 12/976,478, entitled "Fibre Based Panels with a Decorative Wear Resistance Surface," filed in the U. S. Patent and Trademark Office on Dec. 22, 2010.
Ziegler, Göran, et al, U.S. Appl. No. 13/444,604, entitled "A Powder Mix and Method for Producing a Building Panel," filed in the U. S. Patent and Trademark Office on Apr. 11, 2012.
Persson, Hans, et al., U.S. Appl. No. 13/444,653, entitled "Powder Based Balancing Layer," filed in the U.S. Patent and Trademark Office on Apr. 11, 2012.
Ziegler, Göran, et al, U.S. Appl. No. 13/445,379, entitled "Method of Manufacturing a Layer," filed in the U. S. Patent and Trademark Office on Apr. 12, 2012.
Persson, Hans, et al., U.S. Appl. No. 13/469,799, entitled "Method of Producing a Powder Layer or a Granular Layer," filed in the U.S. Patent and Trademark Office on May 11, 2012.
Vetter, Georg, et al., U.S. Appl. No. 61/612,672, entitled "Method for Producing a Building Panel," filed in the U. S. Patent and Trademark Office on Mar. 19, 2012.
International Search Report dated Jul. 3, 2009, PCT/EP2008/065489.
Written Opinion of the International Searching Authority dated Jul. 3, 2009, PCT/EP2008/065489.
Pervan, Darko, et al., U.S. Appl. No. 13/693,979, entitled "Recycling of Laminate Floorings," filed in the U.S. Patent and Trademark Office on Dec. 4, 2012.
Ziegler, Goran, et al., U.S. Appl. No. 13/705,310, entitled "Fibre Based Panels with a Decorative Wear Resistance Surface," filed in the U.S. Patent and Trademark Office on Dec. 5, 2012.
Pervan, Darko, et al., U.S. Appl. No. 13/793,971, entitled "Wood Fibre Based Panels with a Thin Surface Layer," filed in the U.S. Patent and Trademark Office on Mar. 11, 2013.
Vetter, Georg, et al., U.S. Appl. No. 13/804,355, entitled "Method for Producing a Building Panel," filed in the U.S. Patent and Trademark Office on Mar. 14, 2013.

* cited by examiner

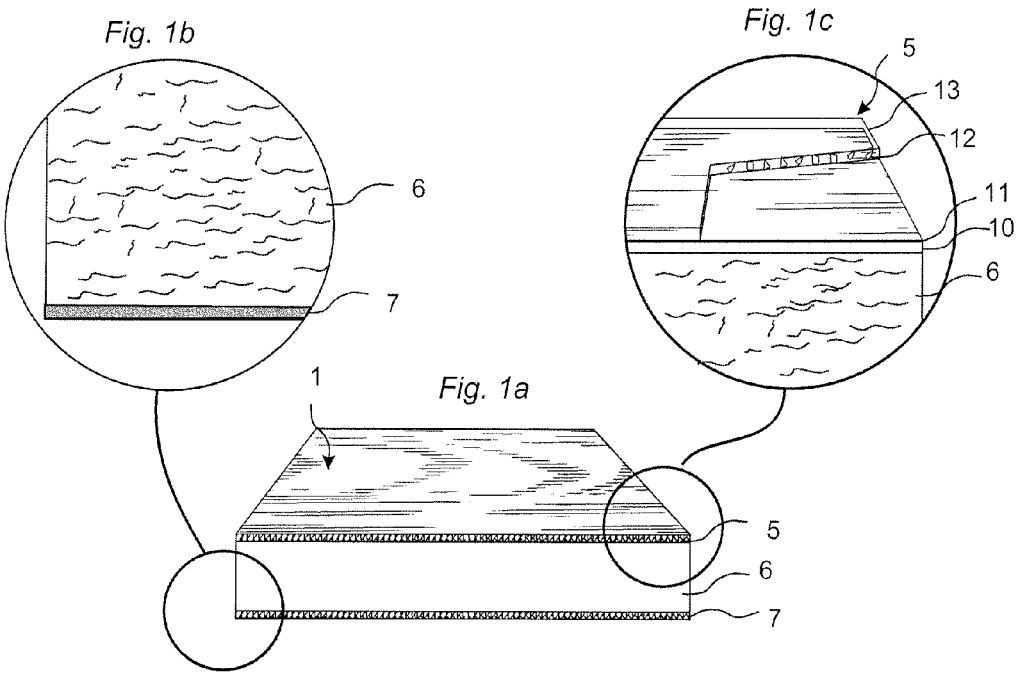
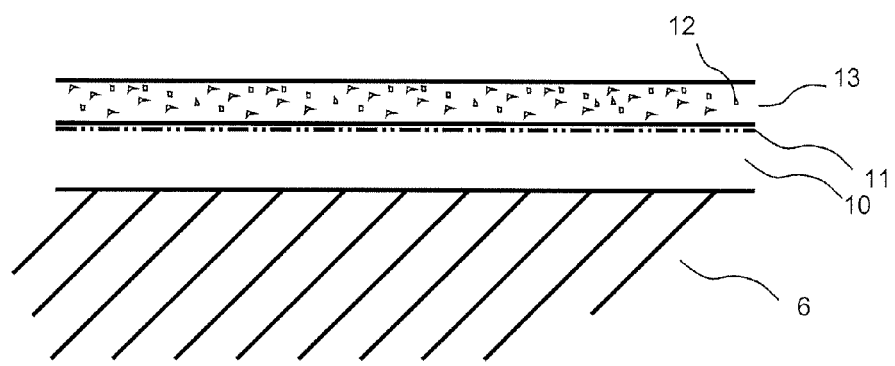
PRIOR ART

PRIOR ART

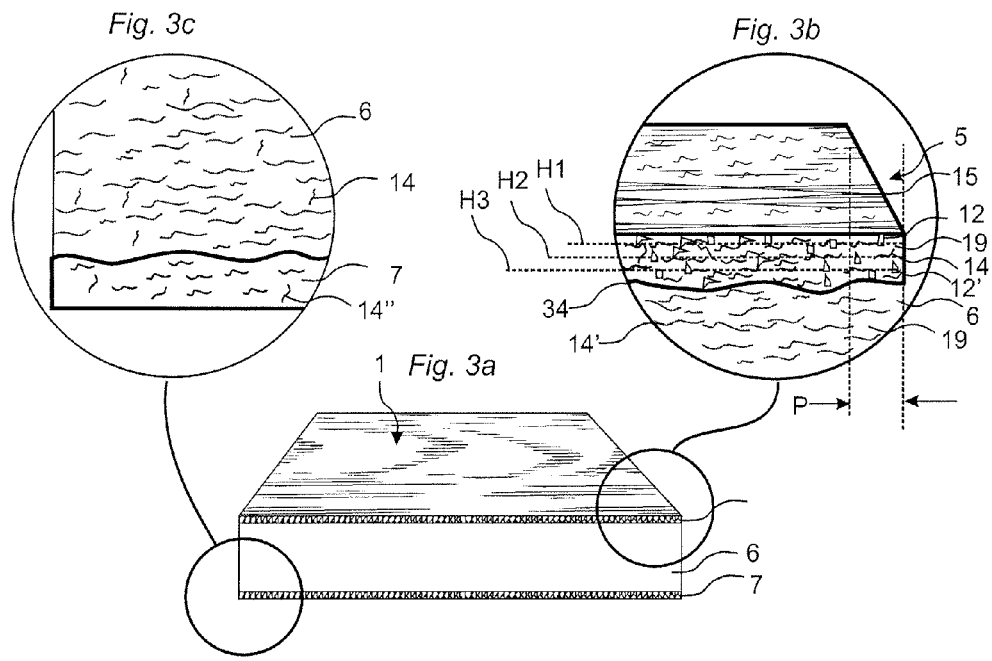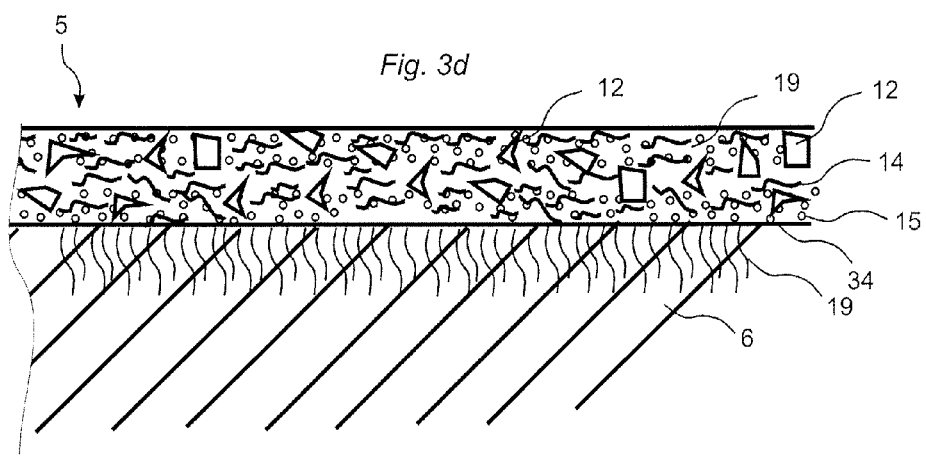

*Fig. 5a*
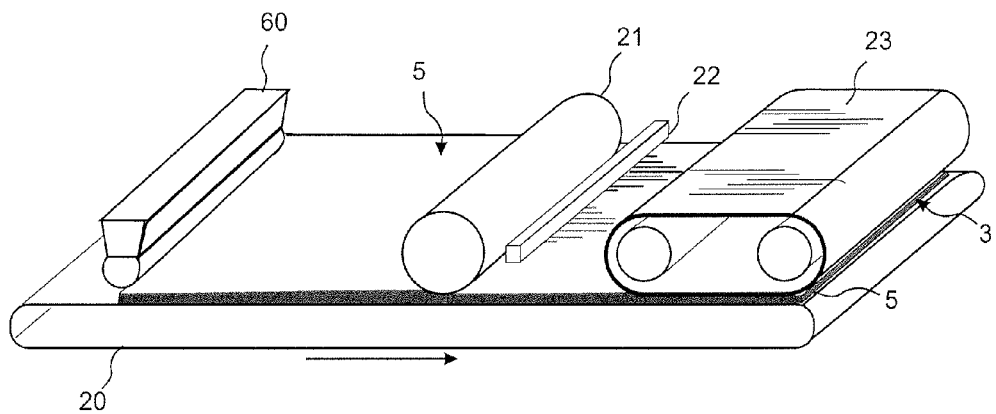
*Fig. 5b*
*Fig. 5c*
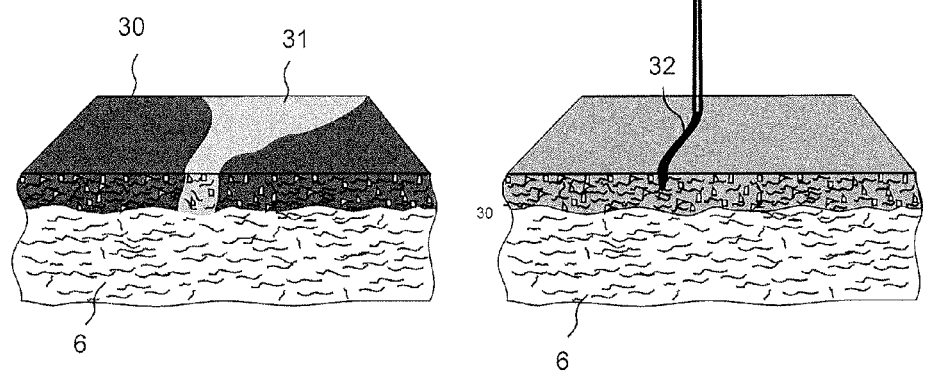

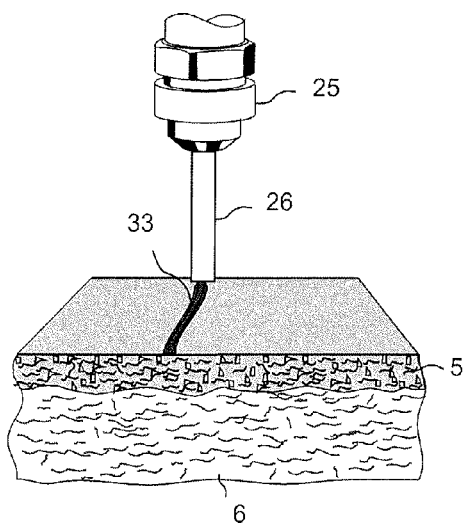
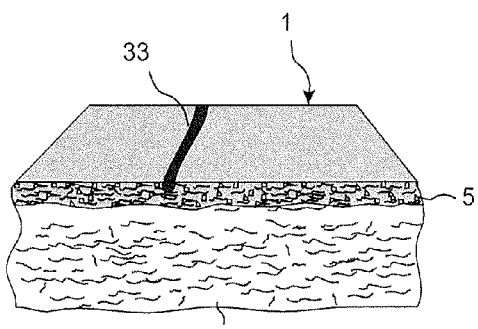
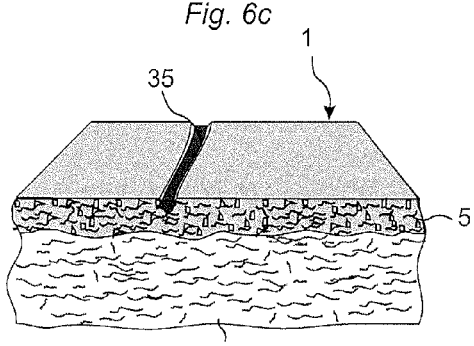
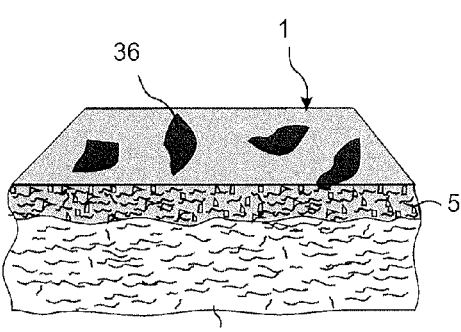
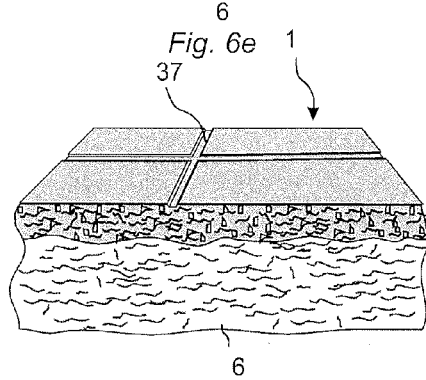
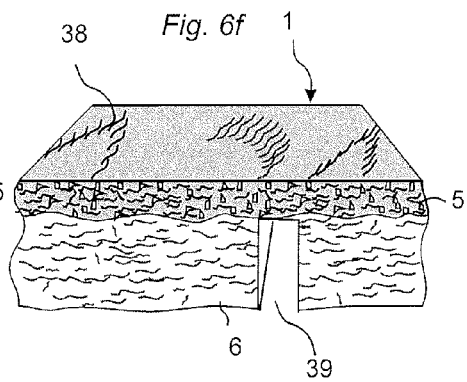

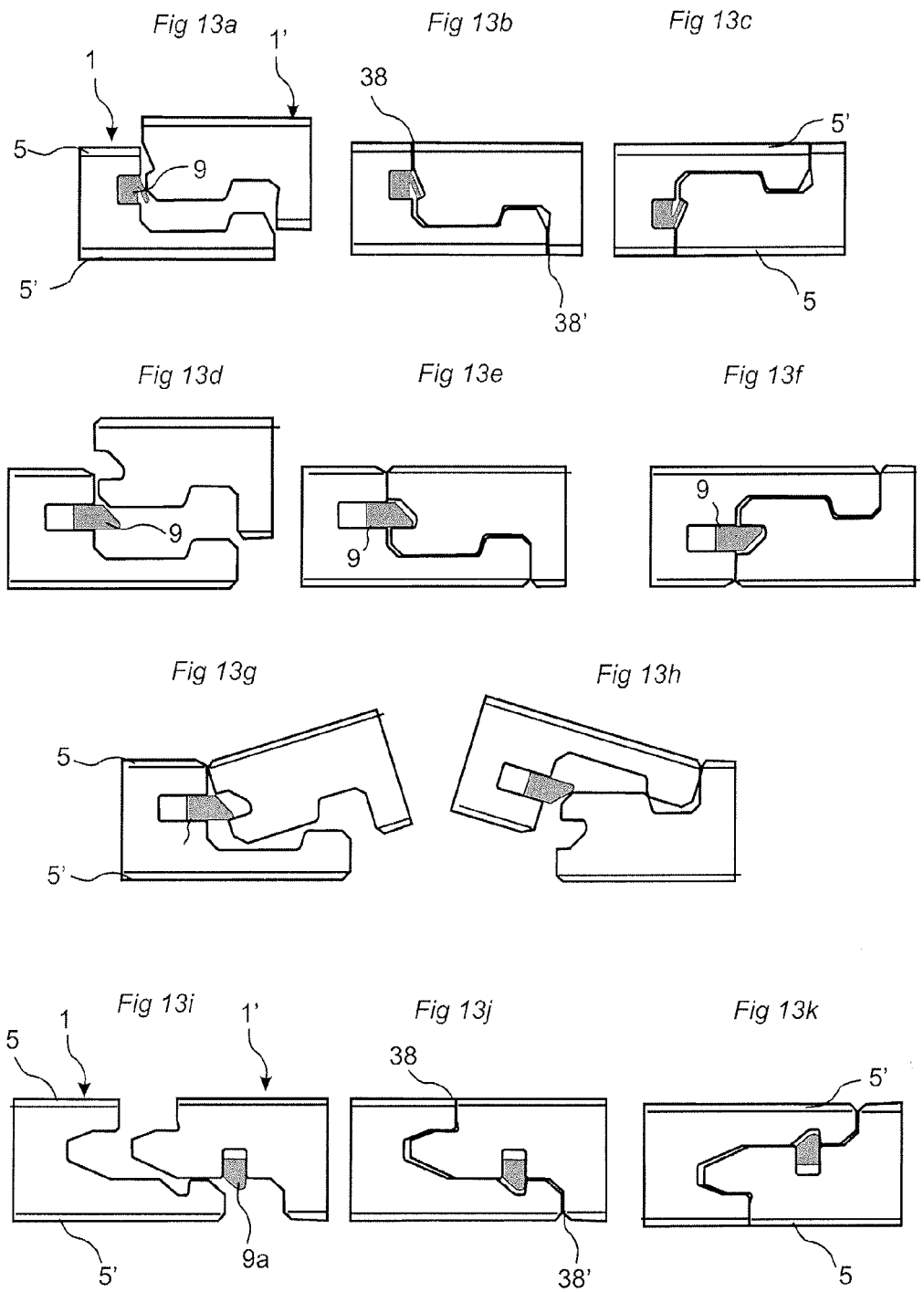

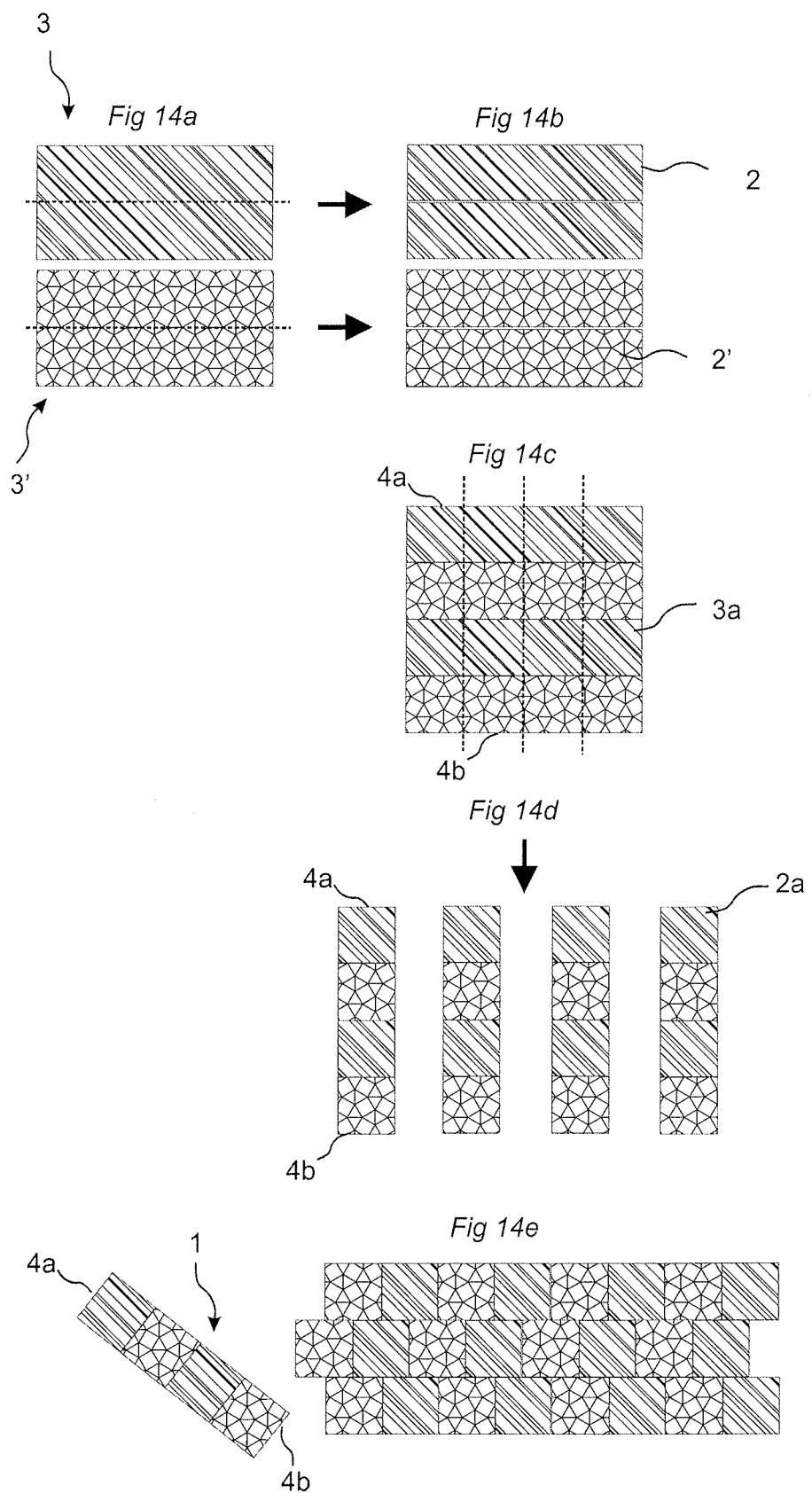

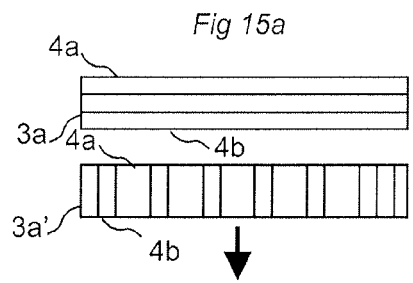
Fig 15a
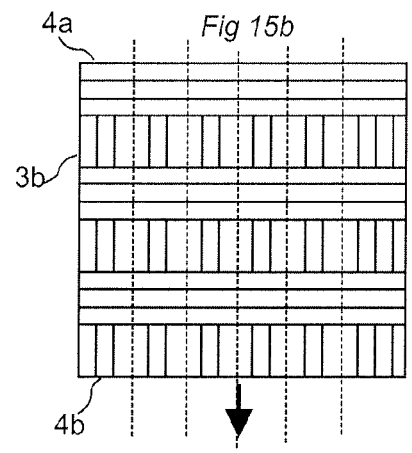
Fig 15b
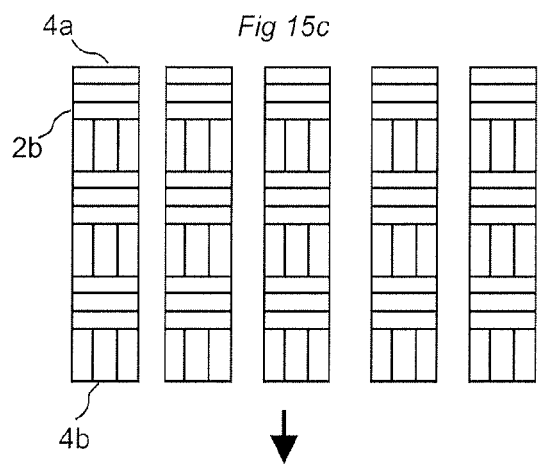
Fig 15c
Fig 15d
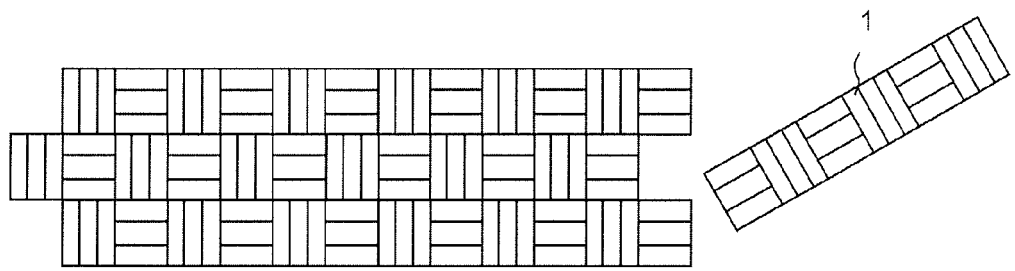

FIBRE BASED PANELS WITH A WEAR RESISTANCE SURFACE

TECHNICAL FIELD

The disclosure generally relates to the field of fibre-based panels with wear resistant surfaces for building panels, preferably floor panels. The disclosure relates to building panels with such wear resistance surface and to production methods to produce such panels.

FIELD OF APPLICATION

The present disclosure is particularly suitable for use in floating floors, which are formed of floor panels with a wood fibre core and a decorative wear resistant surface. The following description of technique, problems of known systems and objects and features of the invention will therefore, as a non-restrictive example, be aimed above all at this field of application and in particular at floorings which are similar to traditional floating wood fibre based laminate floorings. The disclosure does not exclude floors that are glued down to a sub floor.

It should be emphasized that the disclosure can be used as a panel or as a surface layer, which is for example glued to a core. The disclosure can also be used in applications as for example wall panels, ceilings, and furniture components and similar. It is even possible to produce components that could for example replace metal or plastic components generally used in the industry, for example automotive components. Such components could be produced with an advanced shape and properties. Wear resistance, impact resistance, friction and cost structure could be comparable or better than for other conventional materials.

BACKGROUND

Wood fibre based direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface generally comprise two paper sheets, a 0.1 mm thick printed decorative paper and a transparent 0.05-0.1 mm thick overlay paper applied over the decorative paper and intended to protect the decorative paper from abrasion. The print on the decorative non-transparent paper is only some 0.01 mm thick. The transparent overlay, which is made of refined α-cellulose fibres, comprises small hard and transparent aluminium oxide particles. The refined fibres are rather long, about 2-5 mm and this gives the overlay paper the required strength. In order to obtain the transparency, all natural resins that are present in the virgin wood fibres, have been removed and the aluminium oxide particles are applies as a very thin layer over the decorative paper. The surface layer of a laminate floor is characterized in that the decorative and wear properties are generally obtained with two separate layers one over the other.

The printed decorative paper and the overlay are impregnated with melamine resin and laminated to a wood fibre based core under heat and pressure.

The small aluminium oxide particles could have a size in the range of 20-100 microns. The particles could be incorporated in the surface layer in several ways. For example they could be incorporated in the pulp during the manufacturing of the overlay paper. They could also be sprinkled on the wet lacquer during impregnation procedure of the overlay or incorporated in the lacquer used for impregnation of the overlay.

The wear layer could also be produced without a cellulose overlay. In such a case melamine resin and aluminium oxide particles are applied as a lacquered layer directly on the decorative paper with similar methods as described above. Such a wear layer is generally referred to as liquid overlay.

With this production method a very wear resistance surface could be obtained and this type of surface is mainly used in laminate floorings but it could also be used in furniture components and similar applications. High quality laminate floorings have a wear resistance of 4000-6000 revolutions, which corresponds to the abrasion classes AC4 and AC5 measured with a Taber Abraser according to ISO-standard.

It is also known that the wear resistance of a lacquered wood surface could be improved considerably by incorporating aluminium oxide particles in the transparent lacquer covering the wood surface.

The most common core material used in laminate floorings is fibreboard with high density and good stability usually called HDF—High Density Fibreboard. Sometimes also MDF—Medium Density Fibreboard—is used as core. Other core materials such as particleboard are also used.

HDF is produced as follows: Roundwood such as for example pine, larch or spruce are reduced to wood chips and then broken down into fibres in a refiner. The fibres are thereafter mixed with a binder and then subjected to high pressure and temperature to form a board.

DEFINITION OF SOME TERMS

In the following text, the visible surface of the installed floor panel is called "front side", while the opposite side of the floor panel, facing the sub floor, is called "rear side". The sheet-shaped material that comprises the major part of a panel and provides the panel with the required stability is called "core". When the core is coated with a surface layer closest to the front side and preferably also a balancing layer closest to the rear side, it forms a semi-manufacture, which is called "floor board" or "floor element" in the case where the semi-manufacture, in a subsequent operation, is divided into a plurality of floor elements. When the floor elements are machined along their edges so as to obtain their final shape with the joint system, they are called "floor panels". By "surface layer" are meant all layers which give the panel its decorative properties and its wear resistance and which are applied to the core closest to the front side covering preferably the entire front side of the floorboard. By "decorative surface layer" is meant a layer, which is mainly intended to give the floor its decorative appearance. "Wear layer" relates to a layer, which is mainly adapted to improve the durability of the front side.

By "horizontal plane" is meant a plane, which extends parallel to the outer part of the surface layer. By "horizontally" is meant parallel to the horizontal plane and by "vertically" is meant perpendicularly to the horizontal plane. By "up" is meant towards the front side and by "down" towards the rear side.

KNOWN TECHNIQUE AND PROBLEMS THEREOF

The wear resistant transparent layer which is used in many floors, especially laminate floors, is generally placed on top of a decorative printed paper or on top of a decorative printed surface that is applied to a wood fibre based core. The decorative layer will be destroyed when the thin and transparent protective wear layer has been worn out.

The wear resistance of such floors is in many applications, primarily in shops, hotels, restaurants and similar areas not sufficient. The major reason is that people walk on the floor with sand under their shoes. The decorative layer of a laminate floor is often destroyed in a rather short period if time especially around entrance areas or other areas of heavy traffic and wear such as corridors. Laminate floors cannot reach the same wear resistance as stone floors or a floor made of ceramic tiles.

Linoleum is a well-known floor covering which is made from solidified linseed oil in combination with wood flour, cork dust, limestone and colour pigments. It has a solid surface layer that combines decorative features and wear resistance. This floor has however several disadvantage. The impact and wear resistance is low and it is difficult to create advanced designs. The production cost is also rather high.

Several methods have been used to increase the wear resistance of a laminate floor and they are all based on the principle to include more wear resistant particles such as aluminium oxide in the upper transparent layers over the printed paper or the printed design. The major disadvantage of this method is that the printed design becomes less clear since such thick overlay creates a grey layer, which is not completely transparent.

It is also known that several transparent overlays could be pressed over the decorative paper to form a wear resistant surface layer and that such multi overlays also could have a printed pattern on their lower side. The designs could be coordinated such that when an upper layer is worn out, a lower transparent layer will protect the printed pattern. Due to uncontrolled swelling of the overlay during impregnation it is very difficult to create an attractive and wear resistant surface layer. Another disadvantage is that such multi layer overlays also give a grey and less distinct design pattern, create more tension and a surface, which is more sensitive to humidity changes.

Laminate floorings have many good properties and are more cost efficient to produce than many other floor types such as wood floorings and stone floor. Many improvements have been made since the floor was invented in March 1977. The production is however still very capital intensive and comprises many steps such as:

1. Production of HDF.
2. Sanding of HDF in order to create an even surface.
3. Production of decorative papers.
4. Printing of decorative papers.
5. Production of overlays.
6. Impregnation of decorative papers.
7. Impregnation of overlays.
8. Pressing of decorative papers and overlay to a HDF core and forming a floorboard.
9. Dividing the floorboard into individual floor elements.
10. Machining the edges of the floor panels to form locking systems.

It would be a major advantage if some of these production steps could be eliminated.

It is known that the printed paper in a laminate floor panel could be replaced with digital or direct printing on the surface of the HDF core. The quality of such direct printed floorings is however still inferior to the print of the traditional decorative paper used in laminate floorings and no major cost improvement has been reached yet. The printed layer is protected with a traditional overlay or a coating with a transparent wear resistant layer. The wear resistance and impact resistance is generally inferior to traditional laminate floorings.

Laminate floorings could be produced with very advanced designs where a printed pattern is coordinated with an embossed structure of the surface. The embossing is made during lamination when the surface is pressed against a steel sheet with an embossed structure. This requires that the steel sheet and the printed paper are positioned accurately in a pre-determined position. Special cameras must be used to obtain the positioning and uncontrolled swelling of the decorative paper during impregnation creates major problems. The depth of the embossing is limited by the paper that could be damaged when the embossing is made with sharp edges or to a depth, which exceeds a few tenths of a millimeter. Embossed surfaces similar to a rough stone surface or a hand scraped wood surface or deep grooves that could be used to make bevels in a panel are not possible to make with the present pressing technology and with a reasonable cost structure maintaining the present technical properties and design.

Wood fibre based floorings similar to laminate floorings and direct printed floorings could capture a considerable larger market share if the wear and impact resistance could be increased, if one or several production steps could be eliminated and if more attractive designs could be obtained.

OBJECTS AND SUMMARY

An overall objective of embodiments of the disclosure is to provide a building panel, preferably a floor panel, which has better properties and/or cost structure than the known building panels.

A first objective of embodiments of the disclosure is to provide a fibre based panel, preferably a floor panel, with a wear layer, which has a higher wear resistance and preferably also a higher impact resistance than the present wood fibre based floorings.

A second objective of embodiments of the disclosure is to provide a fibre based flooring and a production method to produce such flooring wherein the floor panel is produced in a more cost effective way than the known floor types and where one of several production steps are made in a more cost effective way or completely eliminated.

A third objective of embodiments of the disclosure is to provide a fibre based floor with new attractive design features which preferably could be combined with high wear resistance and cost effective production.

A fourth objective of embodiments of the disclosure is to provide core materials and surface layers or combination of surface layer and core which could be used to make panels, preferably floor panels, with more favourable cost structure and/or design and/or properties such as wear, impact and sound.

According to a first aspect of the disclosure a building panel is provided comprising a surface layer and a core, which comprises wood fibres. The surface layer comprises a substantially homogenous mix of wood fibres, comprising natural resins, a binder and wear resistant particles.

Embodiments of the disclosure offer several advantages over known technology and especially over conventional laminate floorings.

The wear resistant surface layer, which is a homogenous mix, could be made much thicker and a wear resistance is achieved, which is considerably higher New and very advanced decorative effects could be obtained with deep embossing and by separate decorative materials, which could be incorporated into the homogenous surface layer and coordinated with the embossing.

An increased impact resistance could be reached with a homogenous surface layer, which is thicker and has a higher density.

The homogenous surface layer could comprise particles that have a positive impact on sound and moisture properties.

Production costs could be reduced since cheaper materials could be used and several production steps could be eliminated.

The wear resistant particles are preferably aluminium oxide particles. Other suitable materials are for example silica or silicon carbide. In general all materials with a hardness of Rockwell C hardness HRC of 70 or more could be used.

Embodiments of the disclosure offer the advantage that the wear resistant surface layer which is a homogenous mix and not separate layers, could be made much thicker and a wear resistance, which is 5-10 times better than in the present laminate floors could be reached. It is possible to make a wear resistant surface layer where abrasion of the surface will only reduce the thickness with for example 0.10 mm for each 10,000 revolutions. 50,000 revolutions will only decrease the thickness with about 0.5 mm and the wear resistance and the decorative properties will be maintained. The wear resistant particles are preferably aluminium oxide and the binder is preferably a synthetic thermosetting resin such as for example a melamine resin.

Decorative effect could be obtained with wood fibres, other types of fibres and/or decorative wear resistant particles only. The decorative effects are however in the most preferable embodiments obtained by colour pigments that are applied into the homogenous surface layer.

Wood fibres in the surface layer comprising natural resins, for example lignin, could be of the same type as used in HDF or particleboard. They are therefore opaque and not transparent as in an overlay paper sheet. The raw material price for such fibres is much lower than for α-cellulose fibres where the natural resins have been removed in the production process in order to obtain transparency.

A particularly preferred embodiment is a floor panel comprising a surface layer and a wood fibre based HDF or particleboard core. The surface layer comprises a substantially homogenous mix of wood fibres, comprising natural resins and of the same type as used in HDF or particleboard, a binder of a synthetic thermosetting resin, aluminium oxide particles and colour pigments.

It could be mentioned as a non-restricting example that the surface layer could comprise of for example about 25% (weight) aluminium oxide, about 25% wood fibres, about 25% melamine formaldehyde resin and about 25% colour pigments. The surface layer could have a thickness, which is for example in the range of 0.1 mm-3 mm or even more. Other combinations are of course also possible. The melamine part could vary for example between 10-35%. The content of the colour pigments could be very low for example only about 0.1-5%. Wear resistant particles could be in the same range and could for example vary from a few percent to 35% and even higher. The mixture should be adapted to the desired properties and cost structures. The binders contribute in general to give the surface a high impact and moisture resistance but they are rather costly. Some wear resistant particles are also rather costly. Wood fibres and other fibres are in general rather cheap, especially if they are derived from recycled material.

The wear resistant particles, for example aluminium oxide, give only a very limited contribution to the impact resistance in a laminate floor since they are only applied as a very thin layer (0.1 mm) and the content is generally only about 10-30 gram/m2. The disclosure gives however the possibility to use much more particles in the solid homogenous surface layer and such particles could also increase the impact resistance of the floor considerably. The wear resistant particles are preferably distributed at random and fixed in the surface layer by fibres and binders that surround them. It could be mentioned as a non restricted example that a 0.5-1.0 mm surface layer according to the disclosure could comprise for example 100-400 gram/m2 of wear resistant particles and even higher. It is obvious that there is no lower limit and even rather small amounts could be sufficient in some applications if such particles are incorporated at least partly into the fibre structure.

A wear resistant and decorative surface layer could be formed in several alternative ways. It is possible to produce a strong surface layer with small amounts of wear resistant particles by for example increasing the content of the binder and for incorporating fibres, preferably wear resistant fibres that could be used to replace a part of the wear resistant particles. Plastic fibres, for example nylon fibres or mineral fibres such as glass fibres, could improve the wear resistance considerably in a homogenous surface layer material.

According to a second aspect of the disclosure a building panel is provided comprising a surface layer connected to a core, which comprises wood fibres. The surface layer, which gives the panel decorative effects and wear resistance, is a homogenous layer comprising parts of fibres, colour pigments, a binder and wear resistant particles.

The wood fibres in the surface layer are according to this second aspect completely or partly replaced with other fibres. Preferable embodiments comprises fibres such as vegetable fibres for example jute, linen, flax, cotton, hemp, bamboo, bagasse and sisal and such fibres could be mixed with wear resistant particle, for example aluminium oxide, to create a vegetable fibre based wear resistant surface layer. Plastic fibres, for example nylon fibres or mineral fibres such as glass fibres could also be used in specific preferred embodiments. All fibres mentioned above could be mixed together for example wood/bamboo, nylon/glass fibres etc. Ceramic bubbles could be mixed with fibers in order to for example increase the thermal insulation and acoustical absorption. Such particles could also be non-flammable.

Wood fibres in the core could also partly or completely be replaced with plastic fibres, mineral fibres or vegetable fibres in the same way as described above for the surface layer.

Thermosetting binders are preferred but thermoplastic binders could also be used. It is preferred to have the same type of binder in the core and the surface in all embodiments of this disclosure but combinations are not excluded for example a thermosetting binder in the core and a thermoplastic binder in the surface layer or the opposite.

A surface layer which comprises wear resistant particles with high density, for example aluminium oxide, and where such particles are distributed over a substantial thickness of the surface layer, for example 0.2-1.0 mm, as described above could have a density which is higher than the present laminate surfaces, especially if such a layer also comprises a high degree of binders.

Such surface layer could have a density of 1500-2000 kg/m2 or even higher and the impact resistance could be considerable higher than in traditional laminate floorings where aluminium oxide is only used in very thin well defined overlays with a thickness below 0.10 mm. The density could be lower but should preferably not be lower than 1000 kg/m3. Sufficient impact resistance could be obtained with a high density surface layer even with a rather soft core material such as MDF or particleboard. The high density could also give the floor a sound and feeling, which is similar to a real stone floor.

The core could also be produced with high density especially if small compact fibres are mixed with a high amount of binders and pressed under high pressure.

It is obvious that all preferred embodiments of the first aspect could be combined with the preferred embodiment of the second aspect. This means for example that the same pressure, pressing times, binders, fibres, wear resistant particles, material compositions etc could be used.

According to a third aspect of the disclosure a production method is provided comprising the steps of:

1. Mixing particles comprising fibres or fibres with binders, colour pigments and wear resistant particles.
2. Bringing the particles or the fibres, the colour pigments, the binders and the small wear resistant particles under high pressure and temperature and forming them to a building panel.

This production method could be used to produce all embodiments of the disclosure.

The production method is in a preferred embodiment based on a surface layer comprising wood fibres, aluminium oxide and a thermosetting resin wherein the surface layer is formed and connected to a HDF core or a particle board core in a pressing operation such that it forms a floor board. This preferred production method comprises the following steps:

1. Wood is reduced to chips and then broken down into wood fibres.
2. The wood fibres are mixed with a synthetic thermosetting resin, colour pigments and aluminium oxide particles.
3. The wood fibres, the colour pigments, the aluminium oxide particles and the synthetic thermosetting resin are applied on a surface of a HDF or particleboard core and subjected to high pressure and temperature and formed to a homogenous and solid surface layer on the core such that a floor board is formed.

A separate balancing layer of for example impregnated paper could preferably also be applied on the rear side of the core during the pressing.

Colour pigments are preferable to create an attractive design. It is of course possible to use the production method to produce the panel without colour pigments. Decorative effect could be obtained with different fibres or wear resistant particles only. Aluminium oxide could for example be produced in different colours.

Seven of the ten production steps (2-8 above) could be eliminated since paper is not used and lamination is not required. Printing could be made in line with the production of the floorboard. The binder is preferably a melamine-formaldehyde or urea-formaldehyde or phenol-formaldehyde resin or combinations of these resins. The pressure is preferably about 300N-800N/cm2 and the temperature could be 120-220 degrees C. The pressing time could vary for example from 20 seconds to 5 minutes. It is possible to use very short pressing times, for example about 10 seconds or shorter, especially in embodiments where a rather thin fibre layer is applied on an HDF core before pressing. Thermoplastic binders such as PVC, PE, PP, etc could also be used. Other possibilities are for example natural resins such as sugar or lignin.

The production method could preferably comprise an intermediate pressing step where the fibres are partly compressed but not cured. Printing or application of decorative materials could be made between the intermediate and the final pressing.

Decorative features could also be applied after the curing. Laser could for example be used to engrave the surface and decorative grooves could be made such that surface material is removed to a lower part of the surface, which comprises a layer with a different colour or design than the upper surface portion. Further heat and pressure could be applied to change the colour or to create further embossing of the surface.

Laser could also be used prior to final pressing in order to create decorative patterns and effects such as dark lines or spots that for example are used to copy wood or stone.

The method could be used to produce a whole floorboard. The method could also be used to produce an upper and/or lower layer, which is applied on a known fibreboard or particleboard core, preferably a HDF core. The method could also be used to produce individual floor elements and even the finished floor panels where the edges and even parts or the whole locking system could be formed during pressing.

According to one preferred embodiment, the whole panel is made in a continuous production line where fibres, binders, colour pigments and wear resistant particles or fibres are applied in preferably at least three layers with different material compositions in order to form a panel with a core and a surface layer. A preferred embodiment where the surface layer and the core are integrally formed, continuously or discontinuously, in substantially the same pressing operation is referred to as "integrally formed panel" or IFP. The lower layer or part could be a balancing layer comprising substantially wood fibres and binders only, which are adapted to balance the surface layer. The balancing layer could also be applied as a separate pre fabricated material that could be fused to the core during pressing. It could also be used as a carrier for the fibres when they are transported into a press. The middle layer or middle part is preferably a core layer comprising wood fibres and binders only and the upper layer is a surface layer comprising wood fibres, colour pigments and wear resistant particles or chemicals.

The layers are preferably applied and transported on a conveyor belt and optionally pre-pressed from an initial thickness of for example 30-50 mm to an intermediate thickness of for example 10-20 mm. A decorative pattern could than be applied in line on the pre-pressed surface with for example an ink jet digital device which allows the ink to penetrate into the pre pressed surface. The board is finally pressed under heat and pressure to a thickness of for example 4-10 mm in preferably a continuous pressing operation at the end of the production line where optionally a sanding of the lower balancing layer could be made in order to obtain an accurate thickness if necessary.

An IFP panel could also be produced in a production line comprising a discontinuous press of the conventional type generally used in laminate floor production. The core, the surface layer and preferably also the balancing layer are formed and connected to each other in the discontinuous press.

The production could preferably also be made in a two-step process where the production steps to obtain a core and a surface layer are performed in two separate operations. This production method is referred to as "surface on core" production or SOC. A core of a wood fibre based board such as for example HDF, MDF, particleboard, OSB, plywood and similar sheet materials could be produced in the conventional way. A lower and/or upper layer, comprising the surface layer and optionally also the balancing layer, is thereafter applied to the core with scattering equipment and this could be integrated with the steps that give the surface its decorative properties. A separate balance layer could be applied in a separate production step. The core with preferably the upper and lower layers is thereafter pressed in a continuous or discontinuous press such that the upper surface layer and optionally even the balancing layer are cured and laminated to the pre-fabricated core. All types of core materials could be used and the method is very suitable even for soft core materials and core materials with rough surface portions. The decorative surface layer could fill up irregular surface portions in the core and reinforce the core such that an impact resistant panel is obtained with any kind of decorative surface structures. This decorative surface is not affected by the core surface as in traditional laminate and wood veneer floorings.

The core material and an upper surface layer or lower balancing layer could according to a preferred embodiment also be produced separately in three production steps and the separate layers could be connected to the core by for example gluing.

A separate wood fibre or fibre layer, which could be used primarily as a surface layer but of course also as a balancing layer, hereafter referred to as "separate surface layer" or SSL, could be produced continuously or discontinuous in thickness of for example 0.3-2 mm. Such a surface layer could be used to replace laminate sheets, wood veneer or wood layers in laminate and wood floorings with for example a core of HDF, MDF, particle board, plywood, lamella wood core and similar. The surface layer could have a high density and impact resistance even if it is combined with rather soft core materials.

All these three basic embodiments, IFP, SOC and SSL could be used to produce a floor according to the disclosure. Such floor is in this application generally referred to as a Fibre Composite Floor or FCF. It could be produced as described above with continuous or discontinuous presses and the production steps could be combined in parts. It is for example possible to produce the core and the surface layer or the core and the balancing layer in a integrally formed operation similar to IFP and to apply a balancing layer or surface layer in a separate production step similar to SOC. A pre curing and a final curing with various intermediate steps are also possible to use.

The decorative properties could be obtained in several ways. The surface is in one embodiment made decorative by colour pigments, which preferably are mixed into wood fibres. The whole panel could be coloured. Alternatively colour pigments could be mixed with for example wood fibres, binders and wear resistant particles in the upper layer. A printed pattern could be provided on the basic colour. The printing should be made preferably before the final pressing and curing operation and this will allow the print to penetrate deep into the upper fibre layer. The print could be applied in such a way that it extends a considerable distance, for example 0.1-1.0 mm, into the upper fibre layer after pressing. Vacuum could be used to facilitate and to guide the penetration of the print into the basic fibres. Such a print could create very accurate copies of stone and wood products and it will maintain its pattern even when the surface layer has been worn down considerably. A very durable, decorative and wear resistant surface could be created in a very cost effective way. Fine and well-distributed fibres in the surface layer make it possible to create very distinct and accurate wear resistant printed patterns.

The decorative effects could also be obtained with rather soft separate materials, for example different types of fibres, chips or particles of wood, textiles, plastic, cork, and similar which optionally could be mixed with colour pigments and applied by for example scattering or extrusion as a protruding pattern on the basic fibre surface before the final pressing.

Fibres could also be used to improve mechanical properties. Mineral fibres such as for example glass fibres could increase the strength and flexibility and improve resistance against heat and fire. Natural fibres could also have a positive impact on the properties. Variations in the fibre orientations could be used to increase the decorative effects.

Separate materials applied on the basic surface will after pressing penetrate into the basic surface fibres. The penetration could be controlled very accurately. A hard material composition will penetrate deep into the softer basic fibres. A softer separate material will be more compressed and distributed over a larger surface area. The separate materials should preferably have a different size and/or structure and/or orientation and/or optical effects than the basic fibres and they will automatically create a perfect fit between a desired pattern and a surface structure. The design effects could be even more pronounced if the separate materials have different wear resistance than the basic fibre structure. The surface could be brushed and the different fibre structures will be more visible as in real wood or stone floors. A similar effect could be obtained if the printing paint comprises wear resistant particles, which are applied locally during the printing process. The surface could comprise particles that could swell, expand or shrink after pressing and thereby create an uneven or embossed surface. All these design effects could be maintained when the surface is subject to considerable wear during a long period of time since they extend deep into the surface layer. Repetition effects of a printed pattern could be avoided.

Special hard wear resistant and decorative non wood fibre based materials could also be incorporated into the surface for example synthetic diamond powder or diamond particles preferably with a size of 0.01-0.10 mm. Such diamond particles could also increase the wear resistance and improve friction properties of the floor. Other alternatives are metal powder or flakes, stone powder, ceramic powder or particles, sand and other similar known decorative materials.

Nano particles could also be incorporated and this could for example be used to give the surface improved properties related to glossiness, cleanability, UV stability, friction, wear resistance etc.

Traditional methods where the surface is pressed against an embossed steel sheet or belt or a paper matrix in order to create decorative effects could also be used. The advantage is that the embossing could be made much deeper that in traditional laminate floorings since there is no paper that could be damaged during lamination. Grout lines, grooves and bevels at the edges or in the main surface parts could be made and such structures could have the same or different design type as the main surface. The grooves could be partly or completely filled with separate materials as described above.

All these design effects could be combined. The invention does not exclude additional transparent or non-transparent layers, coating or similar over the basic fibre structure. The design effects could also be used independently in a fibre panel that does not comprise wear resistant particles or colour pigments. In this case the wear resistance could be created with wood fibres and binders only.

All these design effects are preferably created, contrary to the known technology, by methods where prints and colours penetrate deep into a preferably pre formed semi finished surface layer or where separate decorative materials are incorporated into or applied on the main surface layer.

It is also possible, according to embodiments of the disclosure, to create a very glossy surface similar to present laminated or lacquered surfaces. The disclosure offers the advantages that such surface could be polished or brushed in a further production step to an even more attractive surface or it could be polished several times after installation with for example brushes comprising hard particles for example diamond powder. The original glossy surface could be recreated even after several years of hard wear.

Special decorative effects and mechanical properties could be obtained with a surface layer comprising fibres of different wood types or combinations of two or more wood species for example any combination of oak, ash, maple, beach, pine, spruce, birch, merbau or similar. These different wood fibres could also be coloured, heat-treated or modified in similar ways before they are applied as a surface layer.

Advanced decorative effects could be obtained with fibres and decorative particles that could be applied and positioned electrostatically. This method makes it possible for example to position and orient wood fibres and to create a structure similar to a wood veneer. Gravity and airflows could also be used to distribute fibres and particles in a controlled way.

Cork material in the form of small particles or dust could also be used to partly or completely replace wood fibers in all embodiments of the disclosure.

It is known that cork could be used as a surface or backing layer in a floorboard. The layers could be made from granules of cork that are glued or they could be in the form of a cork veneer. The cork is used mainly to reduce sound but also for decorative purposes. It is also known that cork granules could be mixed into for example concrete in order to obtain low thermal conductivity, low density or good energy absorption. It is not known that cork dust could be mixed with a binder, preferably a synthetic thermosetting binder, and wear resistant particles to form a surface layer in a floorboard.

According to a fourth aspect of the disclosure a building panel is provided comprising a surface layer and a core, which comprises wood fibres or cork particles. The surface layer comprises a substantially homogenous mix of cork particles, a synthetic binder and wear resistant particles.

The core could be a traditional wood fibre based core, for example HDF or similar or it could be a core comprising partly or completely cork particles and a binder, preferably a thermosetting binder. Colour pigments could be included.

A particularly preferred embodiment is a floor panel comprising a surface layer and a core, which comprises wood fibres or cork particles. The surface layer comprises a substantially homogenous mix of cork particles, comprising natural resins, a synthetic thermosetting binder and wear resistant particles of aluminium oxide.

The density of the cork surface layer is preferably 800-1400 kg/m3 and the density of the core could be 600-1000/m3.

Embodiments of the disclosure offer the advantage that the surface layer could be made more flexible and softer than in traditional laminate floorings and this could be combined with a maintained or even improved wear and impact resistance. This could also result in a more attractive sound level and lower thermal conductivity. The result could be a more silent and warmer floor.

A floor panel comprising cork particles could be produced according to the same three basic embodiments, IFP, SOC and SSL as described above.

The principles of the disclosure could also be used to produce a core comprising cork that could be used to replace a traditional wood fibre based core for example a HDF panel.

It is known that cork chips with a size of 2-5 mm could be glued together with very low pressure to panel with a density that does not exceed 300 kg/m3. It is not known however that very small cork particles, for example smaller than 1.0 mm, could be mixed with a thermosetting binder and pressed together with high pressure to form a high-density panel that could for example be used as a core material in a floor panel.

According to a fifth aspect of the disclosure a building panel is provided comprising small cork particles and a thermosetting binder that are pressed together to a panel with a density exceeding 600 kg/m3. Such a cork particle based core could be used together with a surface layer comprising cork particles or a surface layer according to the first and second aspects of the disclosure but it could also be used as a core in a floor with traditional surface layers.

A cork core or surface layer could have properties, for example moisture resistance, shearing strength, density and impact resistance similar to or even better than normal HDF material and it is possible to form a strong and a high quality locking system in the cork core edge. The flexibility of the cork particles makes it possible to reach a high impact resistance. The properties are mainly achieved by mixing a thermosetting resin, for example melamine in powder form with small cork particles, preferably with a size of a few tenths of a millimeter or even smaller down to some hundredths of a millimeter, which are thereafter pressed with a pressure of about 300-400 N/cm2 and a temperature of 140-180 degrees C.

The cork core could be used in combination with known surface materials such as laminate, resilient surfaces, fibre based surfaces, wood, wood veneer, linoleum, cork veneer, wall to wall carpets and similar. Several advantages could be reached. A thin surface layer, for example a wood veneer could be applied, prior to pressing, on a sub layer comprising cork particles and binders. Pressing could take place against a press plate, which could create a deep embossing, or deep grooves. The thin surface layer will be formed and laminated to the sub layer. The thin surface layer will not be damaged since the cork particles will be compressed and formed according to the structure of the press plate. This forming technology could also be used in a panel where the sub layer comprises wood fibers or other type of fibres that could be formed by pressing.

A combination core or panel could also be produced with different layers that comprise only cork particles or wood fibre particles or a mixture of wood fibres and cork particles.

It is preferred in all embodiments to use a dry process where the different materials and mixtures of different materials such as fibres, wear resistant particles, binders and colour pigments are distributed and scattered' in a dry form. A liquid or semi liquid process where for instance the binder is mixed into the fibres or particles in liquid form is however not excluded. Scattering could be made with several stations comprising embossed or engraved rollers and brushes that could apply one or several layers of preferably dry materials.

All embodiments with and without wear resistant particles could be used to make panels, which could be applied vertically on a wall as wall panels in interior or exterior applications. Such panels could have a mechanical locking system on long edges that is possible to lock with angling and on short edges a locking system with for example a flexible tongue that allows vertical folding as described in for example WO 2006/043893.

BRIEF DESCRIPTION OF THE DRAWINGS

The disclosure will in the following be described in connection to preferred embodiments and in greater detail with reference to the appended exemplary drawings, wherein FIGS. 1a-1d illustrate a conventional laminate floor panel;

FIGS. 3a-d illustrate a floor panel according to an embodiment of the disclosure;

FIGS. 5a-5c illustrate a production method according to a preferred embodiment of the disclosure and methods to create a decorative surface;

FIGS. 6a-6f illustrate preferred methods to create decorative effect;

FIGS. 13a-k illustrate locking of a floor panel with a decorative surface on front and rear side;

FIGS. 14a-e illustrate a method to create advanced patterns in floor panels made from floorboards with different designs;

FIGS. 15a-d illustrate preferred embodiments of floor panels made from floorboards with different designs;

DETAILED DESCRIPTION OF EMBODIMENTS

Figure 2A:
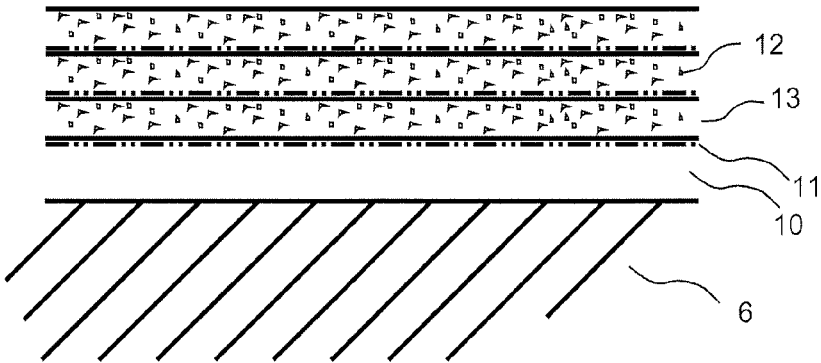
FIGS. 2a-d illustrate surface layers in conventional floor panels.

FIG. 1a shows a laminated floor panel 1 according to known technology comprising a surface layer 5, a core 6 and a balancing layer 7.

FIG. 1c shows the surface layer 5. It has an upper wear layer 13 of a transparent material with great wearing strength. Such a wear layer comprises generally a transparent paper (overlay) impregnated with melamine resin and with aluminium oxide particles 12 added. Aluminium oxide particles are generally positioned in the lower part of the overlay in order to protect the press plates from wear during pressing. A decorative layer 10, comprising of paper with a printed pattern 11 is impregnated with melamine resin and placed under this transparent wear layer 13. The wear layer 13 and the decorative layer 10 are laminated to the core, generally a fibre based core such as HDF, under pressure and heat to an about 0.2 mm thick surface layer 5.

FIG. 1b shows the balancing layer 7 that generally also is a melamine-impregnated paper. This balancing layer keeps the floor panel flat when humidity varies over time. The transparent wear layer is generally 0.05-0.10 mm thick. The decorative printed pattern 11 will be destroyed when the wear layer is worn out.

FIG. 1d shows in detail the upper surface part of a conventional laminate floor as explained above. The aluminium oxide particles 12, which are transparent, are included in the pulp during the production of the transparent overlay 13.

FIG. 2a shows a known surface layer with multiple overlays 13 that have a coordinated print on the lower side in order to improve wear properties. The layers are also in this surface layer placed over a decorative layer 10.

Figure 2B:
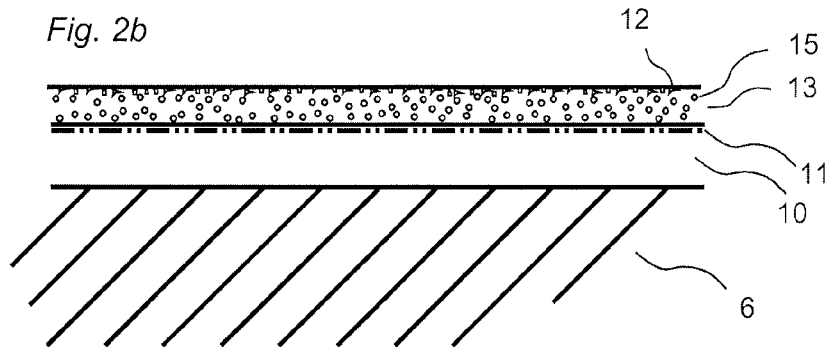

FIG. 2b shows a known overlay, which generally is semi transparent, coloured with colour pigments 15 and placed on a decorative layer 10.

All overlays are made of refined α-cellulose fibres. In order to obtain the transparency, all natural resins that are present in the virgin wood fibres have been removed. The known surface in a laminate floor is in all embodiments made up of well-defined paper layers with constant thickness. Separate layers are used to accomplish the decorative properties and the wear properties. The total thickness of all wear resistant layers does not exceed 0.2 mm. There is a clear distinction between the refined and expensive fibres that are used in the upper surface layers and the non-refined low cost wood fibres that are used in the core.

Figure 2C:
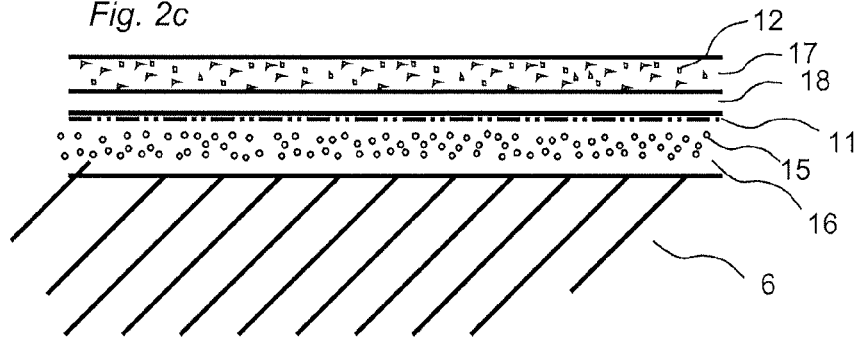

FIG. 2c shows a known direct print on a HDF panel. A base colour 16 comprising colour pigments 15 is applied on a core 6. A print 11 is applied on the base colour and protected against wear by a transparent varnish 18 and in some applications even with a top coating layer 17 that could comprise aluminium oxide. Such a surface layer is colour based and no fibres are used.

Figure 2D:
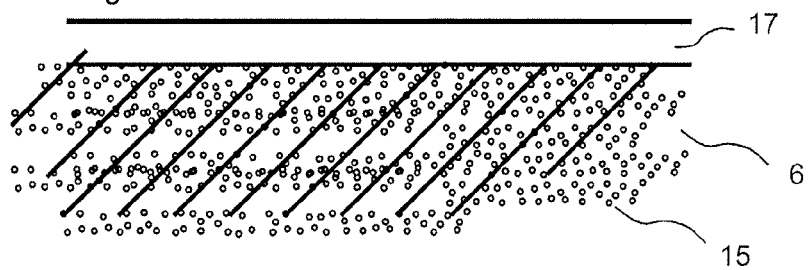

FIG. 2d shows a known coloured HDF panel where colour pigments are 15 are included in the core. The surface is covered with a transparent top coating layer 17. The wear and impact resistance of such a panel is low.

FIG. 3a shows a floor panel 1 according to one embodiment of the disclosure.

A panel 1 is provided with a wood fibre based core 6, a homogenous non-transparent decorative surface layer 5 and preferably a balancing layer 7. The panel 1 is integrally formed in a production process where the surface layer, the core and the balancing layer are formed in the same pressing operation.

FIG. 3b shows the surface layer 5. It comprises a mixture of wood fibres 14, small hard wear resistant particles 12, 12' and a binder 19. Preferably the wood fibres are unrefined, of the same type as used in HDF and particleboard and they comprise natural resins such as lignin. The wear resistant particles (12,12') are preferably aluminium oxide particles. Other suitable materials are for example silica or silicon carbide. Diamond crystals or powder, could also be added into the surface layer. In general all materials with a hardness of Rockwell C hardness HRC of 70 or more could be used and they do not have to be transparent. A mixture of two or more materials could be used. The connection 34 between the core 6 and the surface layer 5 is not a distinct layer, as can be seen in FIG. 3b due to the fact that fibres of the two layers are mixed are fused together. This gives a very strong connection between the core and the surface layer.

The surface layer comprises preferably also colour pigments 15 or other decorative materials or chemicals.

Embodiments of the disclosure offer the advantage that the wear resistant surface layer 5 could be made much thicker than in the known floor panels. The thickness of the wear resistant and decorative surface layer could vary from for example 0.1-0.2 mm to for example 2-4 mm or even more. Wear resistance with maintained decorative properties could be extremely high, for example in the region of 100,000 revolutions and more in a surface layer that is about 1.0 mm thick.

Such a panel could be used as a floor panel but also as a component in a machine, car etc. where a high wear resistance is required and complex injection moulded or extruded components could be formed which also could be reinforced with for example glass fibres.

The surface layer according to a preferred embodiment of the disclosure comprises a vertical portion P with a first upper horizontal plane H1, located in the upper part of the surface layer that comprises a first wear resistant particle 12. It has a second intermediate horizontal plane H2, located under the first wear resistant particle 12 that comprises wood fibres with natural resins. It has a third lower horizontal plane H3, located under the second horizontal plane H2 that also comprises a second wear resistant particle 12. The fibres and wear resistant particles could preferably be mixed with colour pigments. Such an embodiment will give a very wear resistant surface layer that will maintain its decorative properties. The surface will be undamaged when the abrasion has removed the first upper fibres to the second horizontal plane H2. Only about 0.1 mm of the surface will be removed. The abrasion will then remove material to the second horizontal plane H2 and the surface will still maintain its decorative properties. The abrasion must remove materials to the third horizontal plane and only then, provided that there are no further horizontal planes comprising wear resistant particles or colour pigments, will the surface change its decorative properties. The surface layer could comprise many horizontal planes adjacent to each other and located at different distances from the front side of the panel, for example 0.1 mm, 0.2 mm, 0.3 mm, 0.4 mm, 0.5 mm etc and they could comprise wear resistant particles or wood fibres. Embodiments of the disclosure offer the advantage that a wear resistance, which is considerably better, for example 5-10 times better than in the present laminate floors, could be reached. Abrasion of the surface will only reduce the thickness of the surface layer. The wear resistance and the decorative properties will be completely or essentially maintained or changed in a controlled and predetermined way.

A preferable binder is melamine or urea formaldehyde resin. Any other binder, preferably synthetic thermosetting resins, could be used.

FIG. 3c show that a balancing layer 7 comprising preferably wood fibres 14' and a binder could be provided on the lower side of the floor panel. The fibres, the binder and also the pressing temperature should be adapted in an appropriate way to balance the surface layer and to keep the panel flat. The balancing layer 7 is preferably pressed with a higher temperature for example 5-20 degrees higher than the surface layer 5

It could be mentioned as a non-restricting example that the surface layer could comprise of for example 25% (weight) aluminium oxide, 25% wood fibres, 25% melamine resin and 25% colour pigments. The surface layer could have a thickness, which is for example in the range of 0.1 mm-3 mm or even more. The most preferable thickness is 0.5-1.5 mm.

FIG. 3d show a panel where the surface layer 5 has been formed on a core 6 that has been produced in a prior separate operation according to the SOC principle. There is a distinct connection 34 between the core 6 and the surface layer 5. The connection 34 could be very strong since binders 19 from the surface layer 5 penetrate into the upper part of the core 6, especially if the core is HDF or a wood based panel such as for example particleboard. The binders 19 in the surface layer 5 could be specially adapted to penetrate and reinforce the upper parts of the core in order to for example increase the moisture resistance. Different binders or binder contents could be used in the upper and lower parts of the surface layer 5.

Figure 4A:
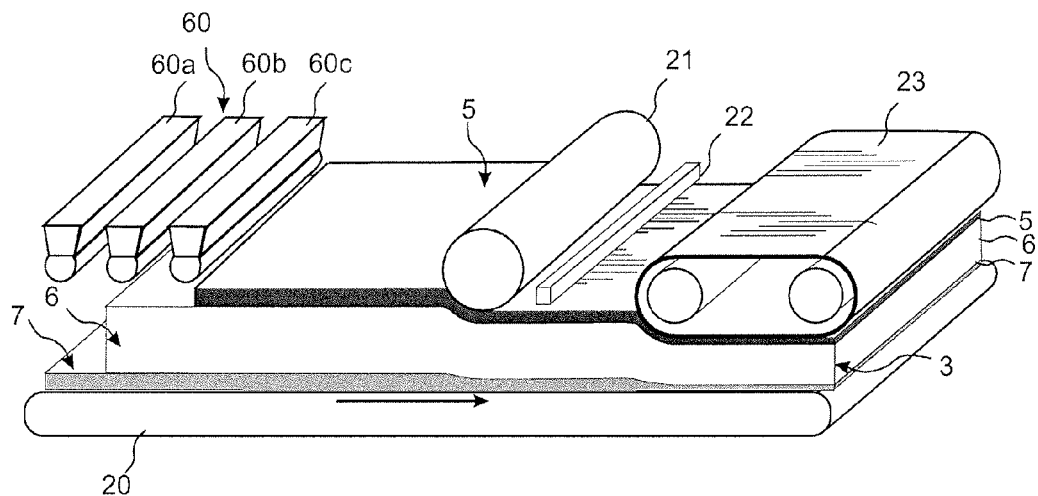
FIGS. 4a-4b illustrate production methods according to a preferred embodiment of the disclosure.
Figure 4B:
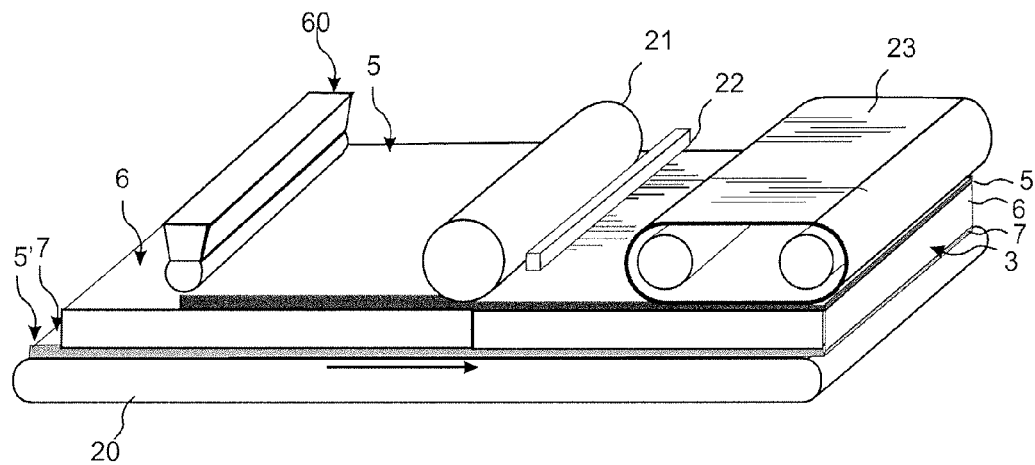

FIGS. 4a, 4b and 5a schematically show preferred production methods, which could be used to produce a fibre based panel. The methods are described schematically and with the surface layer as the upper layer. It is obvious that the production could take place with the surface layer as a lower layer.

FIG. 4a shows production of a panel, preferably a floor panel according to the preferred IFP principle. A scattering station is used to apply a first layer 7, comprising the balancing layer, on a conveyor 20. A second layer 6 comprising the core layer is applied on the balancing layer in the same way. These two layers comprise preferably wood fibres and a binder only. A third layer, the surface layer 5, is applied by the scattering station on the core layer 6. The surface layer 5 comprises preferably wood fibres, a binder and wear resistant particles. The surface layer 5 comprises preferably also a colour pigment that gives the surface layer a basic colour. The production method could preferably comprise an intermediate pressing step, where the wood fibres are partly compressed with a roller 21 or with continuous pressing equipment or a similar device. The fibres are preferably not cured, at least not completely, at this intermediate production step.

The scattering station 60 could comprise several scattering units 60a, 60b, 60c, one for each material composition. An advanced production line could comprise up to ten scattering units and even more.

Printing, colouring and similar design effects on the surface with for example an ink jet printer 22 or similar production equipment that gives the surface layer 5 decorative features could be used in line with the production of the floorboard. Printing is preferably made on a pre pressed surface prior to the final pressing.

A scattering station could also be used after the pre pressing in order to for example apply additional decorative particles. A second pre pressing and even further applications of decorative materials could be made prior to the final pressing.

The pre pressed layers are after printing, if such production step is used, pressed under heat and pressure and the fibres and the wear resistant particles are bonded together with the binder, which cures under heat and pressure. A panel with a hard and decorative surface layer is obtained.

Continuous pressing is preferred but discontinuous presses with one or several openings could also be used.

Pressing could take place against an embossed pressure matrix such as a steel belt 23, an embossed sheet or a paper-based embossed matrix in order to create an embossed surface that optionally could be coordinated with the surface design. High quality coordinated design and embossing could be obtained with an integrated pressing and design method which is not used in the flooring industry since all such design features are based on two separate steps of printing and pressing.

According to embodiments of the disclosure an integrated pressing and design "stamp" method could be used whereby an embossed pressure matrix comprising protrusions, which are covered with a selected paint, for example with a rubber roller that applies the paint only on the protrusions and not on the matrix parts located at lower portions between the protrusions, could be used. During pressing, it is possible to apply the selected paint only in the sections of the surface that are pressed below the top parts of the surface layer and a perfect coordinated design and structure could be obtained. The "stamp" method is described more in detail in FIGS. 16a-e. The paint and the pressing could be chosen such that the paint penetrates into the fibre structure during the initial part of the press cycle. The same method could be used to apply other materials than paint for example special fibres or particles on protrusions located on a pressing matrix and to apply them into deeper structures than the top parts of the surface.

The binding agent is preferably a melamine-formaldehyde resin. The pressure is preferably about 300N-800N/cm2 and the temperature could be 120-220 degrees C. The pressing time could vary for example from 20 seconds to 5 minutes depending on the production speed, panel thickness, binders etc. The density of the floorboard is preferably 700-1000 kg/m3. It is possible to produce very moisture and impact resistant floorboards with a density of 1000-1500 kg/m3. The surface layer may comprise or consist of wood fibers that are essentially smaller than 1 mm. The surface layer may comprise or consist of wood fibers in powder form that are essentially smaller than 0.5 mm. The surface layer comprises preferably or consists of fibres in wood powder form with particles, which are in the range of about 0.1-0.3 mm or even smaller. The fibre particles in the core part could be 0.1-1.0 mm or even larger.

A particularly high quality surface layer 5 could be achieved if the wood fibres, which are mixed with the binder, colour pigments and wear resistant particles, are already pre coated and fully or partly pre cured with a binder, for example a melamine or urea formaldehyde resin, or pressed and than separated mechanically into wood fibre powder or wood fibre chips which are preferably smaller and more compact than the original wood fibres. Such a fibre composition is especially well suited to be mixed with wear resistant particles and could create a compact and well-defined base for the printing operation. The wear resistant particles could be evenly spread over the whole surface layer and a high wear and scratch resistance could be reached. Such coated fibres could be obtained from recycled HDF or HDF based laminate floorings, which could be mechanically cut and separated to small wood fibre chips and/or wood fibres.

The chips and fibres could be used in all layers (5, 6, 7) even if they comprise aluminium oxide or small melamine/paper flakes. The wood fibres could also be separated from the melamine and paper particles and used as melamine coated fibres in the surface 5 and/or in the core 6 and/or the balancing layer 7.

FIG. 4b shows substantially the same production method, which in this preferred embodiment is used to produce a SOC panel. A balancing layer 7 is applied on a conveyor. The balancing layer could be a wood fibre based layer as described above or a traditional balancing paper used in conventional laminate flooring production. A pre fabricated core 6, for example a HDF or a particleboard or any other type of board is placed over the balancing layer. A surface layer 5 is applied with a scattering station 60 on the core, according to the same method as described above, and the upper and lower layers are connected to the core in a press such that a panel is formed with a surface layer 5, a core 6 and a balancing layer 7.

The balancing layer 7 could be decorative and could comprise wear resistant particles. This means that a panel according to the disclosure could have a surface layer 5 and 5' on each side. Such surface layers could preferably have different designs and this will reduce the number of articles that have to be transported and stored. Embodiments of the disclosure are very suitable for such double-sided panels since the cost for providing the rear side with a decorative layer is very limited. Mechanical locking systems could be adapted to allow locking of such panels preferably with horizontal or vertical snapping.

FIG. 5a shows the SSL principle where a panel is formed which could be used as a separate surface layer. The production equipment is in this case used in the same basic way as in the other two methods described above. The main difference is that the floorboard 3 is a surface layer 5 with preferably a thickness of about 0.5-3 mm. This surface layer could be connected, preferably with glue, to any type of core material.

Decorative features could be obtained in many alternative ways. In the most basic embodiment the surface could comprise substantially only wood fibres and wear resistant particles. A design with one basic colour only could be sufficient and in such a case colour pigments are mixed with the wood fibres and no intermediate pre pressing is needed in order to form a base structure for further design steps. Pre pressing could however be used for other purposes as will be explained in the text below.

FIG. 5b shows that a decorative pattern could be obtained by mixing fibres with different colours 30, 31 and/or different fibre structures, fibre sizes, fibre types etc.

FIG. 5c shows an ink jet spray head 24 that could be used to apply a print 32 or a pattern similar to a print on a preferably pre pressed surface. The ink penetrates into the fibres prior to pressing and could be positioned deep into the cured surface after pressing. Ink or colour particles could be applied for example with a depth under the upper part of the surface of 0.1-1.0 mm or even more. The ink should preferable penetrate to a level below the upper wear resistant particles.

FIG. 6a shows that for example an extruder 25 with an extruding head 26 could apply separate extruded fibres 33, with a different colour and/or structure and/or density and/or wear resistant properties, on the basic fibre layer. The extrude fibres are preferably mixed with a binder and optionally also with wear resistant particles.

FIG. 6b shows that the separate fibres 33 could be pressed and bonded into the surface layer 5.

FIG. 6c shows that the separate fibres 35 could be applied with a lower wear resistance then the basic fibre surface. The surface could be brushed and this will remove a part of the upper surface of the separate fibres 35 and a decorative groove will be obtained. This will give a perfect match between the structure and the coloured design.

FIG. 6d shows that other separate materials such as flakes 36 of wood, metal, plastic etc. could be used to give the surface decorative properties and these separate materials could be pressed into the basic wood fibre surface.

FIG. 6e shows that pressing a matrix to the surface could create grooves, bevels, grout lines and similar. Such embossing could be made much deeper than in traditional laminate floorings where the paper will be damaged. Embossing with a depth of for example 1-2 mm or even more could easily be obtained.

FIG. 6f shows that a surface design could be obtained with for example wood fibres, preferably essentially individual fibres or clusters of individual fibres that are located in patterns on the surface. They could be applied in several layers, which are coordinated such that they build up a material layer similar to real wood.

All the above described methods to create design effects could be used in IFP, SOC and SLL embodiments with or without a pre-pressing operation.

Figure 7A:
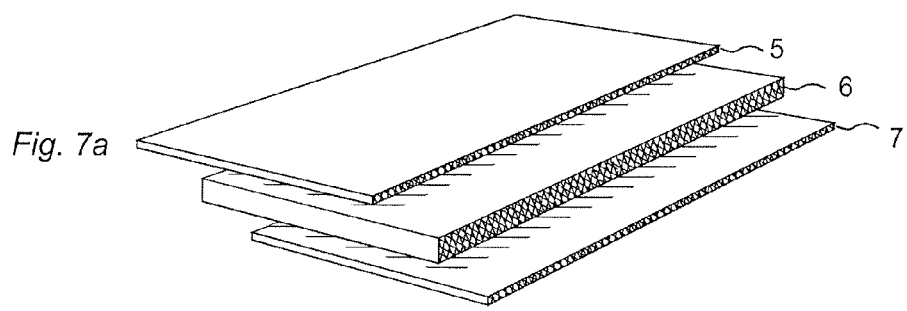
FIGS. 7a-7d illustrate a floor panel and methods to produce an edge portion.
Figure 7B:
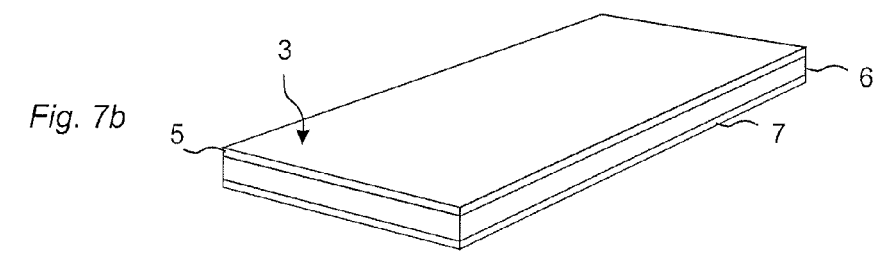
Figure 7C:
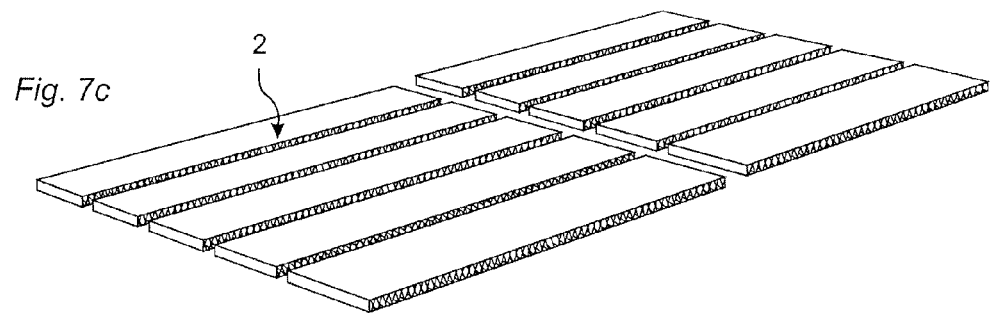
Figure 7D:
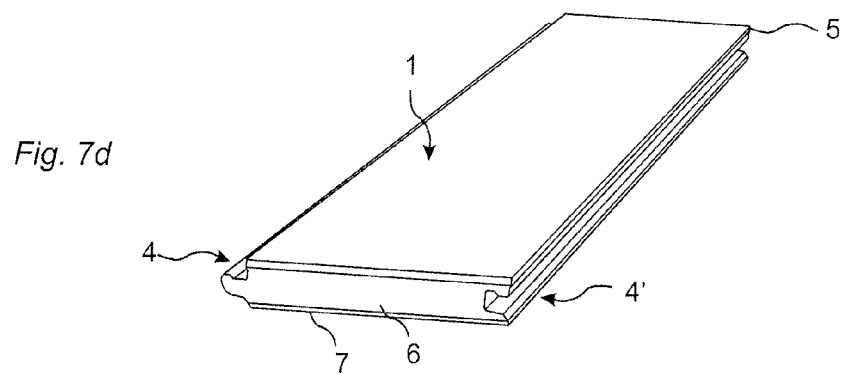

FIG. 7a shows a panel according to an embodiment of the disclosure. It comprises a surface layer 5 which is produced according to an embodiment of the disclosure and which is glued or laminated to a known core material 6. A balancing layer 7 is applied at the rear side as shown in FIG. 7b. The floorboard 3 is produced according to the IFP, SOC or SSL principles described above. FIG. 7c shows the floor board after it has been cut into several floor elements 2. FIG. 7d show floor elements, which have been formed to a floor panel 1 with mechanical locking systems 4, 4' at the long edges. A mechanical locking system is generally also formed on the short edges. All known locking systems allowing locking with angling, horizontal and vertical snapping, side push etc could be used. The floor panels could however also have rather simple locking systems or only straight edges similar to tiles and stone and they could be glue down to the sub floor.

Figure 8A:
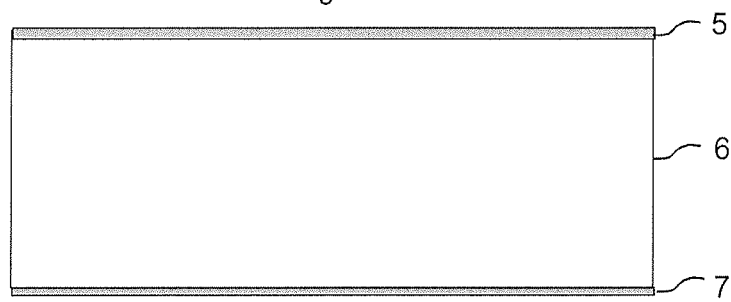
FIGS. 8a-8d illustrate a panel surface and a method to form such surfaces.

FIG. 8a shows a panel according to an embodiment of the disclosure that could be produced with the same basic equipment that is generally used in conventional laminate floor production. The panel comprises a surface layer 5, a HDF core 6 and a balancing layer 7. The surface layer is preferably in a powder form such that it could be scattered as a thin layer and formed to for example a 0.1-0.5 surface layer on a pre fabricated fibre based core, preferably a 6-8 mm HDF core. The binder could be adapted such that pressing could be made in conventional continuous or discontinuous direct lamination presses with pressing times, temperature and pressure similar to the parameters used today. The thickness of the surface layer could vary but it is preferred that the final thickness of the surface layer exceeds the depth of the embossing or at least that these parameters are essentially in the same range. Recycled HDF fibres from the cutting and machining of the edges could be used in the surface layer.

Figure 8B:
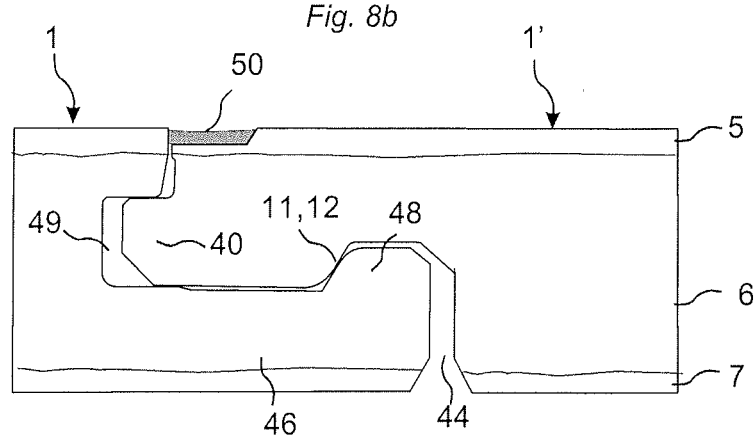

FIG. 8b shows floor panels 1, 1' with a mechanical locking system comprising a strip 46 with a locking element 48 that cooperates with a locking grove 44 and locks the panels 1, 1' horizontally. The locking system comprises also a tongue 40 that cooperates with a tongue grove 49 and locks the panels 1, 1' vertically. A flexible sealing material 50 could be applied during production or during installation between two edges in order to create a decorative effect and/or to prevent moisture to penetrate into the joint. A thermoplastic material could be incorporated into the fibres during production and could be machined to an edge sealing that is integrated into one or both adjacent edges.

The forming of the edges could be made in the conventional way with large rotating diamond tools. The upper edges, which in some embodiments could be extremely wear resistant, could be formed with high quality diamond tools that break and separate the wear resistant particles from the wood fibre matrix. As an alternative laser or carving with diamond tools could be used. A preferable embodiment is a combination of laser and carving where straight cuts and preferable the top edges are formed with laser while U-formed grooves, cavities and rounded parts preferably in the softer core material under the surface layer are formed with carving. A laser beam could also be used to seal the edges, preferably the upper part of the edges, with heat.

Laser cutting is especially suitable to form edges or grooves with a rough structure that looks similar to a rough stone or tile edge. Such rough edges could be formed with a laser cutting head having a beam with a focus position and/or focus distance and/or beam geometry that varies along an edge when for example a part of a panel edge is displaced in relation to the laser cutting head. Such edges are not possible to form with conventional cutting tools. All these methods and embodiments could also be used in traditional laminate and wood floorings.

Figure 8C:
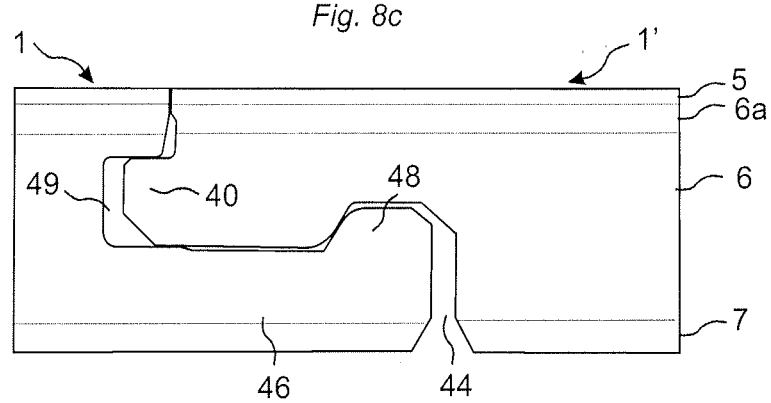

FIG. 8c shows floor panels with a combination core that for example could comprise of a surface layer 5, a core layer 6a comprising for example cork particles bonded together according to an embodiment of the disclosure, a wood fibre based core comprising wood fibres and a balancing layer that for example comprises cork particles. All layers could have different densities.

Figure 8D:
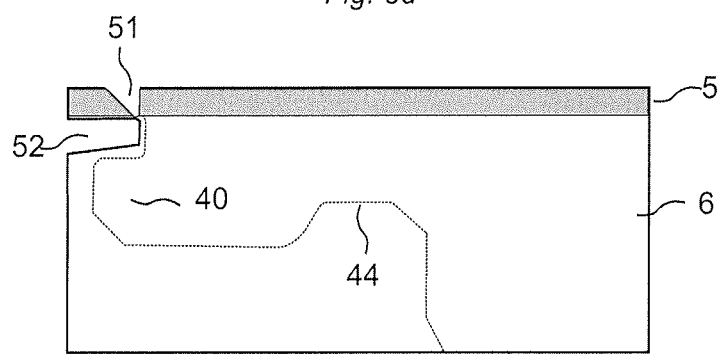

FIG. 8d show that an essentially horizontally extending groove 52 could be formed with for example carving, conventional machining or laser cutting, in the core under the surface layer. An essentially vertical cut 51 could be formed in the surface layer in the same way and an upper surface could be removed with limited machining and tool wear. Rough bevels could be formed in an edge in similar ways.

Figure 9A:
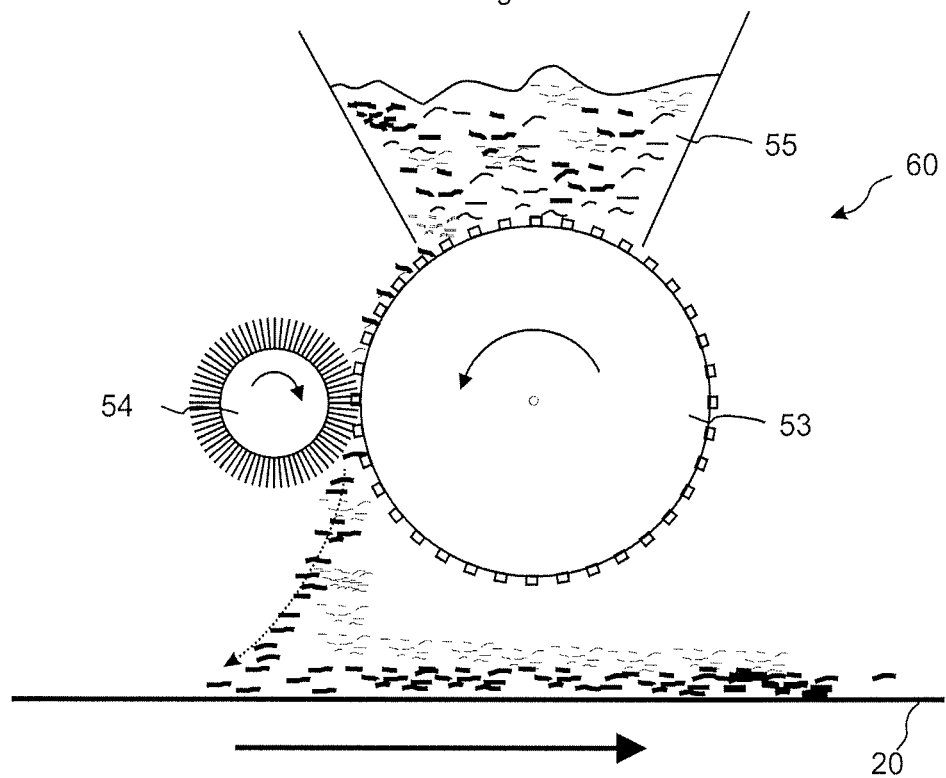
FIGS. 9a-b illustrate a scattering station.
Figure 9B:
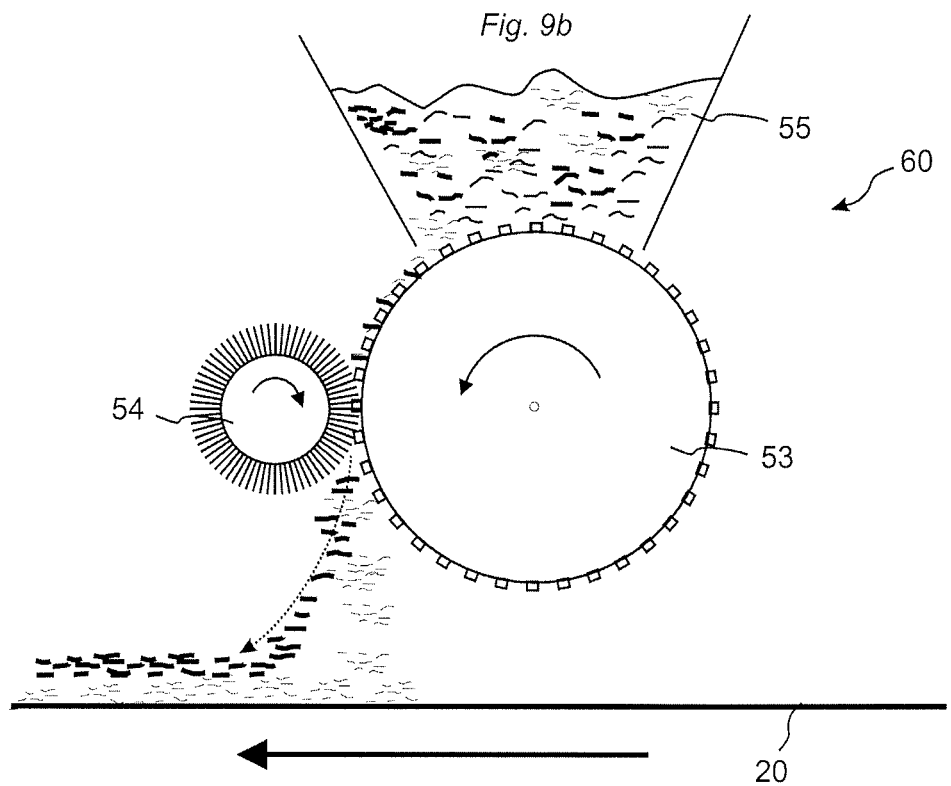

FIGS. 9a,b show a scattering station 60 which could be used to distribute dry materials in layers. Fibres, wear resistant particles, binders in powder form and colour pigments in powder form could for example be mixed and applied into a container 55 that is in contact with an engraved roller 53. This roller 53 brings during rotation the mixed material 56 into contact with a brush roller 54 and the material 56 is applied on a conveyor belt 20 or on another layer or board material The direction of the material flow could effect the position of the particles as can be seen from FIG. 9a where larger and heavier material are applied under lighter particles and FIG. 9b where the opposite takes place. This separation of particles in different layers is obtained by the brush roller 54 that causes the heavier particles to be distributed further away than lighter particles that falls more vertically towards the conveyor belt 20.

Hard wear resistant particles create high abrasion on steel plates during production. This problem could be avoided if one of several of the below mention methods are used.

The upper layer could comprise melamine powder and essential flat aluminium oxide particles.

A very thin upper layer, for example only fibres and binders, which does not comprise aluminium oxide particles, could be applied over a wear resistant layer. This thin layer will disappear shortly after installation. The decorative effects will however be maintained due to the solid structure of the surface layer.

The upper part of the surface layer could comprise a thin layer, which comprises of for example essentially only melamine.

Wear resistant particles in the upper part of the surface layer could be extremely small and have a nano particle size.

Thin wood veneers could be combined with a fibre layer in order to produce a surface layer that has a similar appearance as thicker and more solid wood surface layers. A wood veneer could also be formed and connect to a wood fibre based core in the same production step that is used to form the core. This method could reduce costs and eliminate production steps according to the overall objective of an embodiment of the disclosure.

Figure 10A:
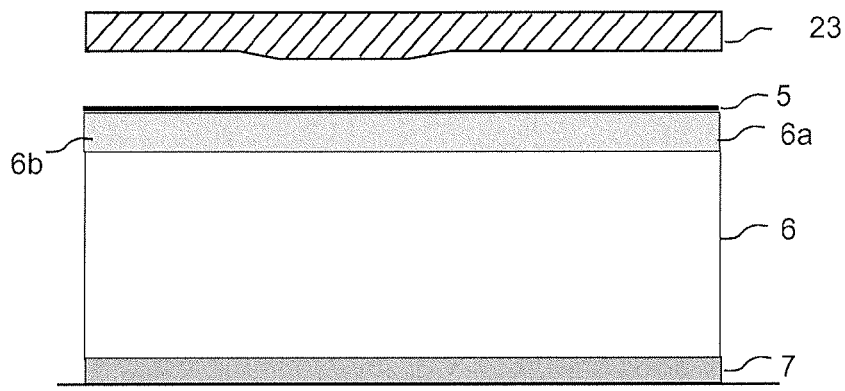
FIGS. 10a-c illustrate a method to form a surface layer.
Figure 10B:
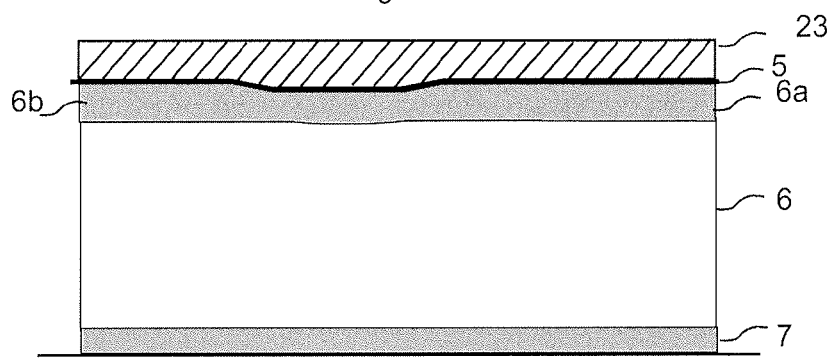
Figure 10C:
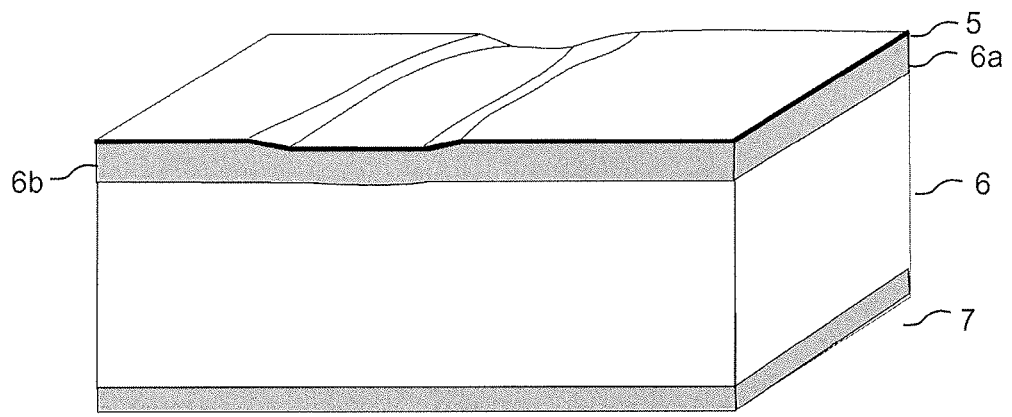

FIGS. 10a-c show how a thin surface layer 5, preferably a wood veneer layer with a thickness of for example 0.3-1.0 mm, could be formed with deep structures that give an appearance similar to solid wood. FIG. 10a shows how a floorboard could be produced. A thin surface layer 5 is applied on a sub layer 6b comprising for example cork 6a or wood fibres mixed with a binder, preferably a thermosetting binder. The sub layer 6b is applied on for example a wood fibre based core, preferably a HDF core. Other core materials could be used such as particleboard, plywood, plastic materials, non-woven impregnated materials of natural fibres etc. A balancing layer 7 could also be applied to the core 6. FIG. 10b show how the core and the layers are pressed together with an embossed pressure matrix 23. This pressing forms the sub layer 6b and the surface layer 5, which are cured and connected to each other under heat and pressure. Very deep embossing could be obtained and a rough surface similar to hand scraped solid wood could be created with a thin wood veneer. The sub layer could be used to improve the properties of the surface layer, for example sound absorption and impact resistance. This method could also be used to apply a wood veneer directly on a core according to the IFP principle or it could also be used in a traditional HDF production line. HDF is formed and the wood veneer is laminated to the core in the same production step. This method gives cost savings, since sanding of HDF and gluing of the veneer could be avoided.

All of the above described embodiments could be used individually or in combinations.

A floor panel with a very wear resistant surface layer according to an embodiment the disclosure could be difficult to cut with an ordinary saw. It is preferred that the floor panel is cut from the rear side where a groove 39 could be made up to the lower part of the surface layer 5 as shown in FIG. 6f. The floor panel can than be bended and split or broken apart.

Individual floor elements 2 or floor panels 1 could also be produced and parts of the locking system could for example be formed in the pressing operation. Tile and stone shaped products could also be produced as individual products without any locking systems and they could be formed at the rear side with pre-glued layers such that they could be easier to install in the traditional way by attaching them to the sub floor. Mechanical locking system could also be used to facilitate glue down installation in the conventional way. A rear side could be produced with a rough structure or a specially adapted structure, which facilitates the gluing.

In order to simplify production and decrease tool wear, special softer fibres or material without wear resistant particles could be applied locally in the surface where separation of the floor board into floor panels will be made and where part if the locking system will be formed. Pre formed grooves on the rear side could also facilitate separation.

Figure 11A:
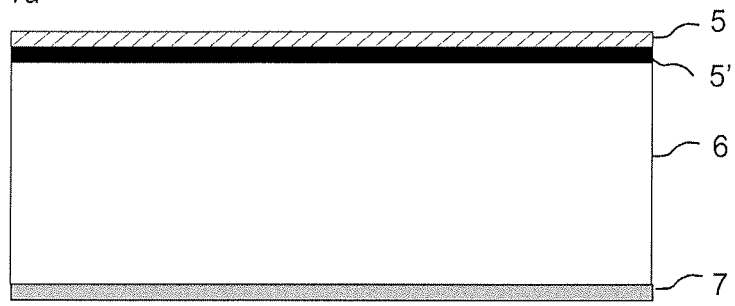
FIGS. 11a-c illustrate methods to create decorative effect on the surface layer.
Figure 11B:
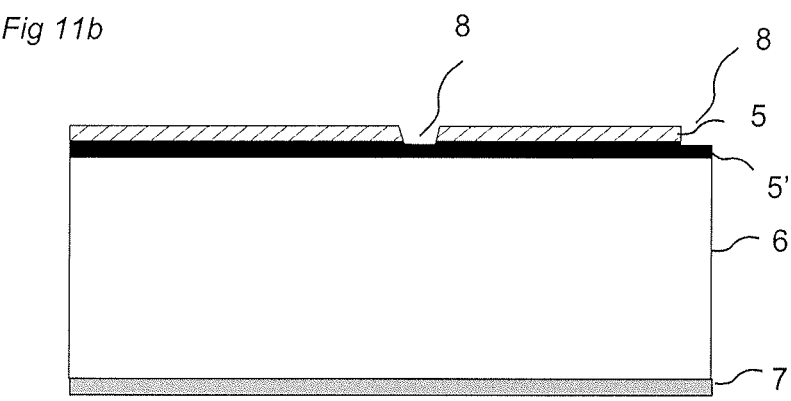

FIG. 11a shows a panel with two separate surface layers 5, 5' with preferably different design or structure. Decorative grooves 8 could be formed to a depth such that the lower surface layer 5' is visible, as shown in FIG. 11b. Very accurate and attractive design effects could be obtained.

Figure 11C:
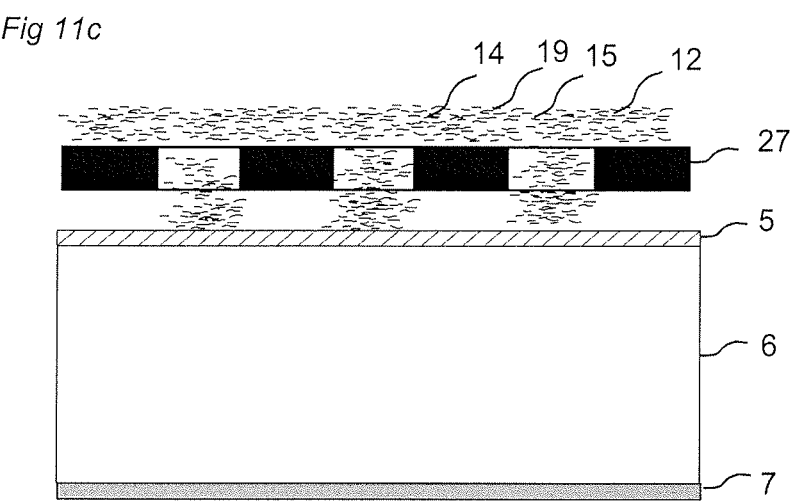

Scattering through a pattern form or schablon 27 as shown in FIG. 11c could be used to create decorative effects. Fibres 14 of different colour and structure, preferably mixed with binders 19 and/or colour pigments 15 and/or wear resistant particles 12, could be applied on well defined surface portions.

Fibres of different colour or structures could also be used to form decorative portions on the surface in varies ways for example by separate extruders that apply fibres in well defined surface portions separated by thin walls which are removed before pressing or that consist of materials that could be included in the surface, preferably in a production with the panel surface pointing downwards during the pressing.

Figure 12A:
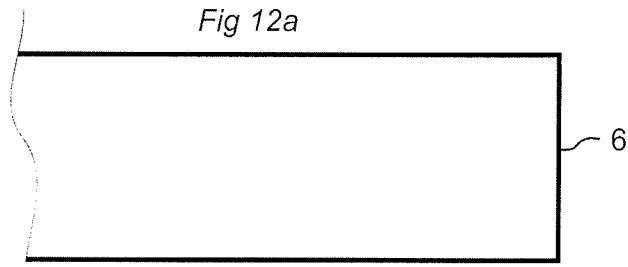
FIGS. 12a-e illustrate discontinuous pressing and forming of a surface layer on a prefabricated core.
Figure 12B:
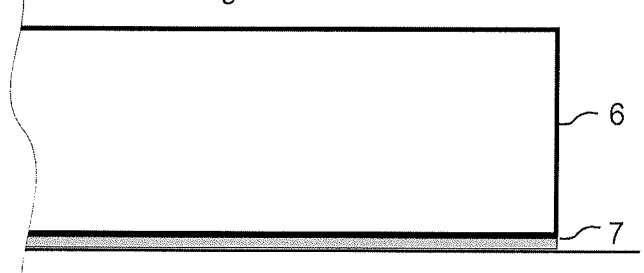
Figure 12C:
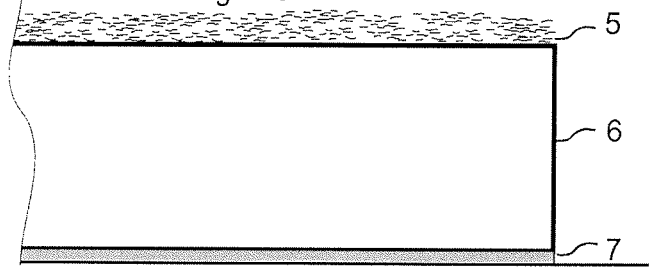
Figure 12D:
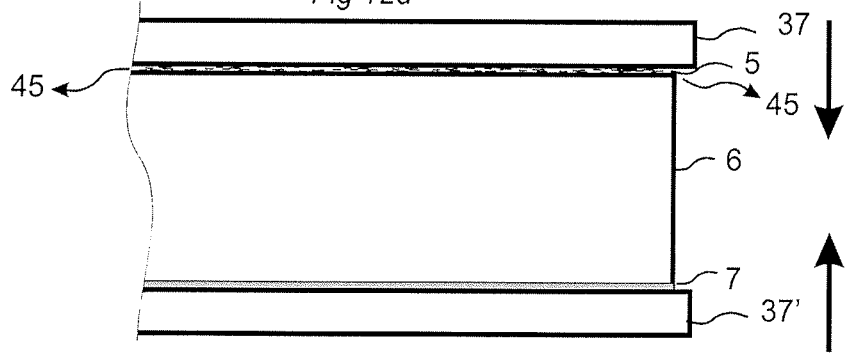
Figure 12E:
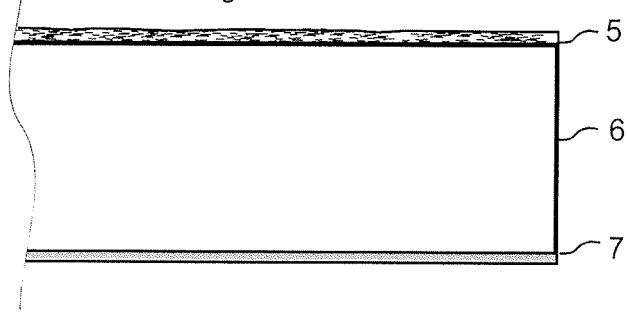

FIGS. 12a-e show in several steps how a panel according to a preferred SOC principle is formed in a discontinuous pressing operation and problems related to such production. A pre-fabricated core 6 of for example HDF is placed on a pre-fabricated balancing layer 7 as shown in FIGS. 12a,b. A surface layer 5 comprising wood fibres, binders and color pigments, preferably in dry form, is placed on the core with a scattering or dust spreading equipment as shown in FIG. 12c. The core with the surface layer and the balancing layer is pressed in a discontinuous press as shown in FIG. 12d and formed to a floorboard as shown in FIG. 12e. FIGS. 12c and 12d show that the soft surface layer 5 comprises prior to final pressing a lot of air 45 that must be evacuated when the upper 37 and lower 37' press tables are closed. This could create an air flow 45 that displaces the soft surface material in an uncontrolled way. This problem could be solved in different ways for example by a pre pressing of the surface layer prior to the final pressing or by applying vacuum that extracts the excess air. Vacuum could be applied on the rear side of the core and used in combination with for example a matrix or release paper on the surface. A HDF core has sufficient porosity to allow vacuum, applied on the rear side, to affect the surface on the front side. Liquid resins or water sprayed over the fibres could also be used to stabilize the surface layer.

FIGS. 13a-k show embodiments of double-sided floor panels with surface layers 5, 5' on both sides and with locking systems which allow installations of such panels with vertical (FIGS. 13a, 13d) snapping, angling (FIGS. 13g,h) and horizontal snapping (FIG. 13i). The locking systems has in the shown embodiments separate flexible tongues 9 or locking elements 9a, which facilitate an easy snapping with, low snapping resistance. Similar one piece locking systems could also be used. Known locking systems have been adjusted such that both the front sides and the rear sides of adjacent panels have edge surface portions 38, 38' that could be locked to each other with preferably a tight fit. It is an advantage if both sides of the floor panel could be used, provided that the extra cost for the second surface layer is limited as could be the case with a floor panel according to the disclosure.

FIGS. 14a-14e shows a method, which could be used to produce floor panels with very advanced surface designs even in a case where the basic original floorboard has a rather simple surface design. This "combi panel" method is particularly suitable for composite floorings according to embodiments of the disclosure but it could also be used in other floor panels with preferably a surface design based on printing, colouring, or other artificial designs which are used in for example laminate floorings, linoleum and resilient floorings.

The method comprises production steps where a first 3 and second 3' original floorboard with different designs or structures, FIG. 14a, are cut into first type of floor elements 2, 2', FIG. 14b. The first type of floor elements is connected to a combi floorboard 3a that comprise at least one floor element of the first and second original floorboards, FIG. 14c. The combi floorboard 3a is cut to a second type of combi floor elements 2a which comprises surface portions of the first and second original floorboards (FIG. 14d) and formed to a combi floor panel 1, FIG. 14e, with preferably mechanical locking systems at the edges. The first type of floor elements 2, 2' is preferably connected to each other with a mechanical locking system in order to form a combi floorboard 3a. A conventional tongue and groove could also be used. The method offers the advantages that a wide range of very advanced combi floor panels 1 could be produced from a limited range of rather simple original floorboards 3, 3'. The need for various types of press plates will be reduced. A broad range of for example laminate floorings could be produced with a limited range of decorative papers.

FIGS. 15a-15d show that the combi panel method could be used to produce extremely advanced decorative effects in a cost effective way. A combi floorboard 3a of a first type could be produced as described above and could be connected with a combi floorboard of a second type 3a', produced in the same way but with a different floor element combination or design. The combi floorboards 3a, 3a' of the first and second type could be connected to a new combi floorboard 3b as shown in FIG. 15b and cut into new combi floor elements 2b as shown in FIG. 15c. Such new combi floor element 2b could have surface portions from two or three or four or more original floorboards. The combination effects are almost unlimited even in the case when a few original floorboards are used to form combi floor elements with different sizes that are combined into combi floorboards. Floor elements with decorative grooves could increase the decorative effects. Turning of the original embossing direction will increase the decorative combinations further. Even a combination of for example black and white original floorboard makes it possible to create advanced decorative effects if combi floor elements of different sizes and preferably with decorative grooves are used.

The long edges of the combi floor elements, as shown in FIG. 14c could be formed and connected with locking systems 4a,4b that could be used as locking systems on the short edges in the combi floor panel 1 as shown in FIG. 14f. This will decrease the production cost since no final machining of the short edges will be needed in order to form a locking system and all combi floor elements could be of the same size. Special locking systems could also be made that could be used to form more advanced locking systems on the short edges in a final machining process, for example a locking system with a flexible tongue allowing vertical locking. The final machining could be very simple and limited to simple horizontal or vertical grooves.

Figure 16A:
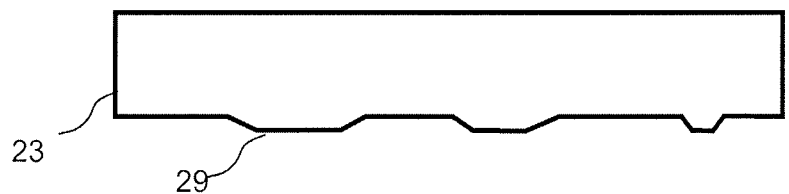
FIGS. 16a-e illustrate a method to obtain in register embossing of a surface layer.
Figure 16B:
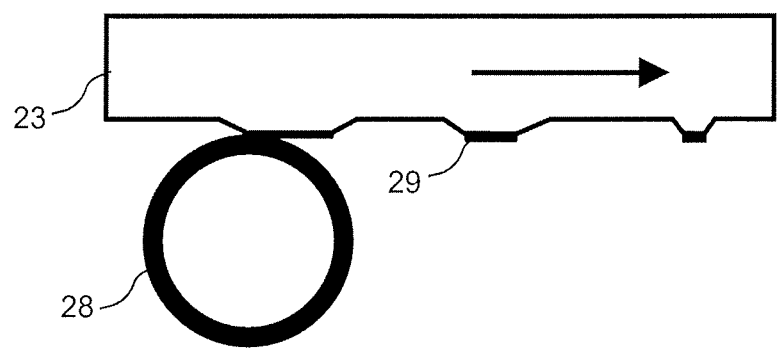
Figure 16C:
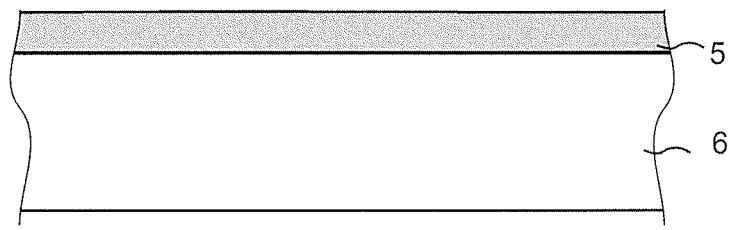
Figure 16D:
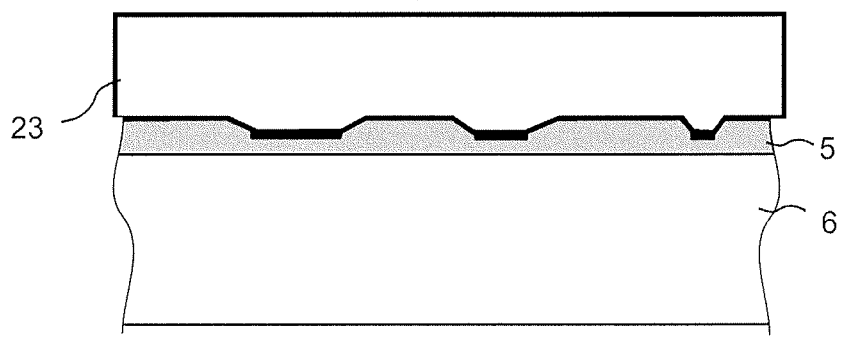
Figure 16E:
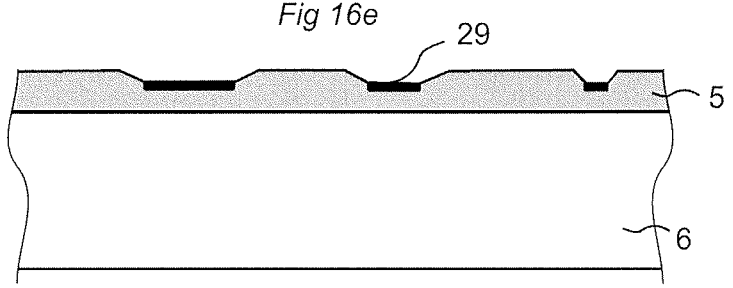

FIGS. 16a-e show a preferable method to create a surface layer with an in register embossed surface (EIR), especially in a composite flooring according to embodiments of this disclosure. An embossed pressure matrix 23 is provided preferably as a sheet, structured paper, a roller and similar with a surface that comprises embossed protrusions 29 as shown in FIG. 16a. A decorative material for example paint or coloured fibres or similar is applied on the protrusions 29 with an application device for example a rubber roller 28 or similar. A surface layer 5 comprising uncured fibres and binders is provided as shown in FIG. 16c and the pressure matrix 23 is pressed against the surface layer 5, as shown in FIG. 16d. The decorative material 29 will be positioned at the lowest surface portions and a perfect in register embossing will be obtained as shown in FIG. 16e.

This method is very suitable for all types of surfaces where decorative parts could be included in the surface during the final forming and curing of the surface in a pressing operation. Paint could be used that during pressing penetrates into the basic fibre structure.

The description below and the FIGS. 17a-17f are intended to show explanatory embodiments of some process variations that have been explored within the scope of this disclosure.

The first example is related to an integrally formed panel (IFP) with a total thickness of 8-10 mm, a surface layer of about 1 mm and a balancing layer of about 1 mm.

EXAMPLE 1

In the present case the resulting product has a decorative surface texture achieved through an embossed paper.
The following raw materials are used:
  Melamine resin in powder form
  Aluminium oxide in powder form 70-110 microns
  Colour pigment
  Wood fibres of HDF/MDF panels, mechanically separated, comprising natural resins
Process Operations:
  Drying & Moisture Control.
  The wood fibers are dried to a moisture content suited for the process, for example 5-8%.
  Sieving.
  A sieving operation is used to separate and classify the fibers into fibers suited for further processing and to fibers that need to be mechanically milled in order to reduce the size further.
  Milling
  The fiber fractions with large fibers are milled to a useful size and recirculated to the sieving operation.
  Mixing
  Raw materials are mixed to compositions suitable for the different layers, such as the surface layer, the core, and the balancing layer, using mechanical dry mixing technology ensuring a homogenous mixture. The different compositions are stored in separate containers.
  Surface Layer Composition
  The surface layer of the IFP product is based on a mixture of Melamine resin (e.g., Kauramine 773, BASF, Germany), Aluminum Oxide (e.g., ZWSK180, Treibacher, Austria), colour pigments for example a black pigment (e.g., Bone Black, Alfort & Cronholm, Sweden) and wood fiber (e.g., production waste from laminate floor profiling) sieved to a fiber size smaller than 150 μm.
  In this explanatory embodiment the following proportions were used:

| Surface layer composition. | |
|---|---|
| Material | Amount (g/m2) |
| Wood fiber | 670 |
| Melamine resin | 670 |
| Pigment | 80 |
| Aluminium oxide | 670 |

Core Layer
The core layer of the panel is based on a mixture of Melamine resin (e.g., Kauramine 773, BASF, Germany) and wood fiber (e.g., production waste from laminate floor profiling) milled to a fiber size in the range of 150 to 600 μm.
The composition was used in the following proportions:

| Core layer composition. | |
|---|---|
| Material | Amount (g/m2) |
| Wood fiber | 6700 |
| Melamine resin-773 | 670 |

Balancing Layer
The balancing layer of the panel is based on a mixture of Melamine resin (e.g., Kauramine 773, BASF, Germany), Yellow pigment (e.g., Yellow Ochre, Alfort & Cronholm, Sweden) and wood fiber (e.g., production waste from laminate floor profiling) sieved to a fiber size smaller than 150 μm.
The composition was used in the following proportions:

| Balancing layer composition. | |
|---|---|
| Material | Amount (g/m2) |
| Wood fiber | 670 |
| Melamine resin-773 | 670 |
| Pigment | 80 |

Figure 17A:
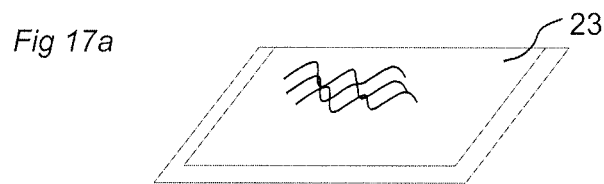
FIGS. 17a-f illustrate in detail an example of a preferred embodiment of an integrally formed panel.
Figure 17B:
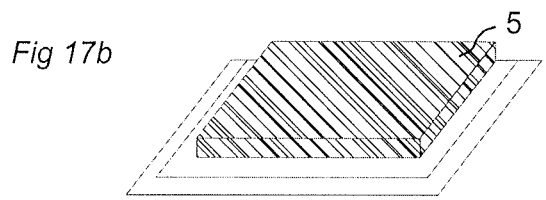
Figure 17C:
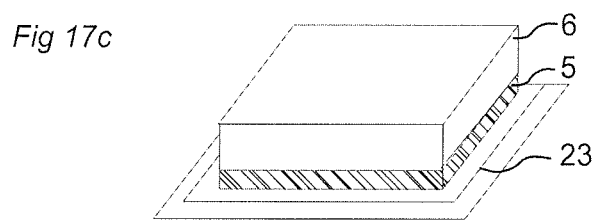
Figure 17D:
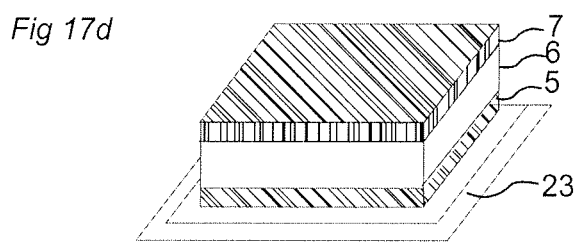
Figure 17E:
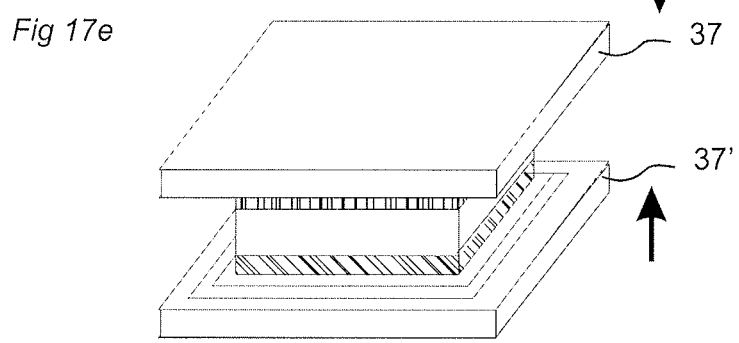
Figure 17F:
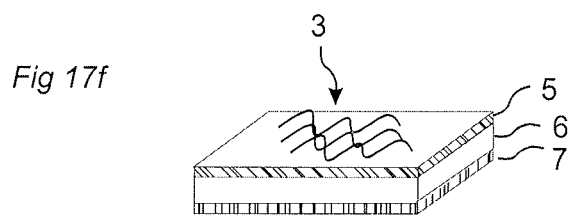

Scattering the Top Layer
The panel is produced with the decorative surface layer downwards. Hence, the initial step of scattering is to position a surface texture material such as embossing paper 23 (e.g., Sappi, US) on a thin aluminum plate as shown in FIG. 17a.
The top layer material 5 is then scattered on the embossing paper 23 using the scattering equipment shown in FIG. 9a. This is shown in FIG. 17b.
The core layer material 6 is scattered on the top layer 5 as shown in FIG. 17c.
Scattering Backing Layer
The balancing layer 7 is scattered on the core layer 6 as shown in FIG. 17d and covered with a release paper.
Loading
The aluminum plate carrying the scattered layers is loaded into a press.
Pressing
The scattered layers are pressed with an upper 37 and lower 37' press table in the press, as shown in FIG. 17e, with a pressure of 40 kg/cm2. The press is heated from both sides to 160° C. and held for two minutes. The laminated material is cooled to 40° C. prior to opening the press.
Unloading
When the press is opened the laminated panel is lifted out of the press and the embossing paper and the release film are removed. The resulting product, that in this embodiment is a floor board 3, is shown in FIG. 17f. The floor board is shown with the decorative surface layer 5 upwards.

Sawing, Profiling & Packaging

The floorboard is cut to floor elements and machined to floor panels with mechanical locking systems at the edges. The finished product could preferably be conditioned to a suitable climate prior to packaging and shipping.

EXAMPLE 2

The process description below is related to a surface on core panel (SOC) where a surface layer is produced on a separate pre-fabricated core. The panel has in this preferred embodiment a decorative surface layer of about 0.4 mm and the total thickness is about 8 mm.

The following raw materials are used:
Melamine resin in powder form
Aluminium oxide
Pigments
Wood fibers
High Density Fiber Board (HDF) as a core
Backing paper as balancing layer Process Operations:

Drying and moisture control, sieving, milling and mixing operations are substantially the same as for the IFP panel described above.

Surface Layer

The surface layer of the product is based on a mixture of Melamine resin (e.g., Kauramine 773, BASF, Germany), Aluminum Oxide (e.g., ZWSK180, Treibacher, Austria), Black pigment (e.g., Bone Black, Alfort & Cronholm, Sweden) and wood fiber (e.g., production waste from laminate floor profiling) sieved to a fiber size smaller than 150 μm.

The composition for the surface layer was as follows:

| Surface layer composition. | |
|---|---|
| Material | Amount (g/m2) |
| Wood fiber | 130 |
| Melamine resin-773 | 130 |
| Pigment | 130 |
| Aluminium oxide | 130 |

Scattering on a Core

The product is produced having the decorative surface layer upwards. Hence, the initial step of scattering is to position a core material (7.8 mm Varioboard (High Density Fiberboard (HDF)), Wiwood, Sweden) under the scattering device shown in FIG. 9a.

The surface layer material is then scattered on the HDF.

Loading

The HDF carrying the scattered surface layer is positioned on top of a backing paper (e.g., Melamine resin impregnated 200 g/m2 paper, DKB, Germany) that is carried by a release foil. Also the scattered layer is covered by a release foil. The materials are loaded into a press.

Pressing

The press is closed to a pressure of 40 kg/cm2. The press is pre heated from both sides to about 180° C. and held for twenty (20) seconds.

Unloading

When the press is opened in hot condition the laminated product is lifted out of the press and the release films are removed. The product is left to cool to ambient temperature.

Sawing, profiling, packaging etc. is made in the same way as for the IFP panel.

The described SOC production method makes it possible to create a surface layer in a floor panel which is about four times more wear resistant than a conventional laminate flooring. Impact resistance is also better. The pressing time is substantially the same, which means that the pressing capacity and cost is substantially the same for both products. The raw material cost for the surface layer in a SOC panel is however lower even in embodiments where the surface layer comprises more aluminium oxide and colour pigment than in a traditional laminate floor panel. The main cost advantage is the fact that no surface papers has to be produced, printed and impregnated.

The fibres in the surface layer are as described above preferably recycled fibres from the cutting and machining of the edges. The fibre content in the surface of the SOC panel in the described example above is about 5% of the total fibre content and this is substantially the same amount as the amount of fibres that will be obtained from the edge machining. This means that the fibre cost could be almost zero. Conventional laminate flooring production gives a considerable amount of excess fibres and such fibres could be used in the surface, core and balancing layer of a floor panel according to the disclosure.

A particleboard core that is generally less costly than HDF could be used to reduce the production cost further.

The present invention is not limited to the described embodiments and Figures.

The binders could for example comprise formaldehyde free binders, which are regarded as more environmental friendly than traditional binders used in laminate floorings. A preferable formaldehyde free synthetic binder is a liquid or dry thermosetting binder such as for example carboxy or hydroxy functional polyester with suitable cross-linking agent. An example of such is the combination of the carboxy functional polyester Uralac P880 (DSM, NE) and the curing agent Primid XL-552. Another synthetic thermosetting binder that can be used is functionalized polyacrylates. Suitable fictionalization is for example carboxylic that can be paired with epoxy and/or hydroxy functionalities. An example of the combination of hydroxy and carboxy fictionalization is found in for example Acrodur 950L made by BASF (DE). The binder ratio, pressing time and pressure are substantially the same as for a melamine formaldehyde resin. Other formaldehyde free thermosetting binders, which could be used, are based on urethane chemistry such as with the combination of polyol compounds based on polyester, polycarbonate, polycaprolactone or polyacylate chemistry with isocyanate functional compounds including basic isocyanates such as di-phenylmethane diisocyante (MDI). The use of crude MDI (pMDI) can also be used without further addition of compounds including isocyanate reactive groups.

It is also possible to obtain an environmentally friendly "green" product by using natural resins as a binder for example lignin, suberin, modified starch or modified proteins or other similar natural resins.

Chemical foaming agents such as sodium bicarbonate, together with a binder, could for example be used in order to decrease the density and/or to increase the thickness after pressing to make decorative effects. Other similar exothermic or endothermic chemical blowing agents are azoisobutyronitrile (AIBN) and azodicarbonamide (ADC). Gas or liquids could also be used to facilitate foaming as for example possible through the addition of liquid filled plastic microspheres such as Expancel®.

Lower density could also be achieved by the introduction of low density fillers such as silica aerogels, for example Cabosil.

The pressing operation which preferably is a dry process could alternatively be replaced by a liquid process where a powder slurry or a paste comprising wood fibres, binders, preferably synthetic thermosetting binders and wear resistant particles, preferably aluminium oxide, could be used for continuous or discontinuous mold filling with low or high pressure such that a floor panel with for example bevelled edges and preferably a locking system could be formed. Such a production method is more complicated and more costly than the embodiments described above, but could be used in special applications such as for example wear resistant base moldings.

Printing using the "stamp" method could be replaced with a "vibration" method. If the panel for example is produced with its front side downwards against a matrix, a vibration step could be added after the first surface layer is scattered on the matrix. The vibration could be used to position the scattered material—comprising for example particles of a certain colour or scratch resistance—into the deepest spots of the matrix. This means that those deepest parts on the matrix will be on the highest surface points of the final panel. A "perfect" coordination between a design and an embossing, generally referred to embossing in register (EIR), could be achieved. Additional decorative layers may be applied on the matrix such that they comprise upper parts on the matrix and lower parts on the panel surface.

Digital or direct printing could for example be used to apply a print indirectly on the panel surface for example prior or during the curing of the surface. A "transfer" print could be provided on a carrier such as an aluminium foil or a press plate or a structured paper. The print could be transferred from the carrier to the panel surface prior to pressing or during pressing. The printing device could for example be placed on the upper side in a continuous press and the print could be in register with the embossing of the steel belt. Such transfer printing, may also be accomplished by first applying a colour on the structured foil with e.g., a roller, removing the colour with a scraper from the outer parts of the structured foil and then adding a new colour with e.g., a rubber roller on these outer parts.

If an original product, for example stone, is copied both in relation to colour and embossing a "perfect" reproduction could be obtained with the above methods. Density and wear resistance could be adapted such that the reproduced panel feels and performs like a real stone.

Colour pigments and other decorative or non-decorative materials could be included in the surface and could give different design effects when subjected to different heat and/or pressure. This means that decorative effects could also be obtained by using varying heat on the press plate surface to create different décor colours with the same base materials. The structure of the pressing matrix could be used to create different pressures and this could also give different designs in the low and high spots on the surface. An increased pressure could be obtained locally by applying more material on some surface portions than on other adjacent portions. Increased density in specific portions that preferably constitutes edge portions in the final floor panel could also be made in a similar way. This could be used to form a strong locking system and to improve moisture resistance. This means that the density profile could very along a horizontal plane in the surface or in the core. An increased amount of wear resistant particles and/or binders could be applied on the protruding surface portions in order to increase wear resistance, impact resistance or to create decorative effects. This embodiment of the disclosure is characterized in that the panel comprises a surface with protruding portions and lower parts wherein the protruding surface portions comprise different material compositions than the lower parts.

A printed foil could be used that melts into the top layer during the pressing operation. Such foil could be combined with additional wear resistant particles or design particles, chemicals for water resistance impregnation or special chemicals to create a glossy surface.

Decorative particles such as colour flakes or fibres could be used to produce stone replicas with a 3D "printing" effect. Thermo plastic particles with colour pigments that completely or partly will melt during the pressing operation could also be used in the surface layer and different viscosity of the particles in heated condition could be used to control the decorative effects created by the decorative particles.

Special problems could occur when a core of for example HDF is placed on a scattered fibre layer that comprises a backing layer or a surface layer. The air flow of the core, when it is lowered downwards towards the fibre layer, will blow away fibres, especially if the aim is to shorten the pressing cycle as much as possible. The same problem occurs if the press table is closed against an upper uncured fibre layer. Such problems could be solved by applying liquids on the fibres, for example liquid binders or similar. Another solution is to use a special vacuum equipment to place the board material on the scattered fibre structure in order to evacuate excess air. A vacuum gripper could be used with the same properties as a vacuum table often used when thin board materials has to be machined. Perforated backing material could also be used in order to stabilize the balancing layer, the core and the surface layer during the infeed into a press. Vacuum could be used to completely or partly replace pre-pressing prior to final pressing.

To improve wear resistance, the structure paper/foil could be coated with liquid melamine mixed with $Al_2O_3$ and dried. A print could be applied to this dried surface and transferred to an upper preferably wear resistant fibre surface, when the panel is cured in the press. Several advantages could be obtained:

a) grooves in the upper decorative part, extending to a lower part with different design, could be made in order to create decorative groove portions.

b) a design could be created that could be varied during the lifetime of the product when parts of the surface is worn down, similar to wear of a natural stone.

This method could also be used to increase scratch resistance in conventional laminate floorings.

Random colour distribution can be achieved with airbrush technique and be programmed and/or created with "random generator".

Double sided panels could also be produced with flexible tongues or separate material that is applied on the edges during installation such that all panels could be locked against any other panel with any of the two sides as a surface side.

Using an overlay with wear resistant particles is not excluded and this could increase the wear resistance.

The invention claimed is:

1. A method of manufacturing a building panel comprising the steps of:
   mechanically mixing wood fibres with a binder and wear resistant particles into a mix; and
   bringing the mix, including the wood fibres, the binder and the wear resistant particles, under heat and pressure, thereby forming a building panel.

2. The method as claimed in claim 1, wherein the building panel is a floor panel.

3. The method as claimed in claim 1, wherein the binder is a thermoplastic resin.

4. The method as claimed in claim 1, wherein the binder is a thermosetting resin.

5. The method as claimed in claim 1, wherein the wear resistant particles comprise aluminium oxide.

6. The method as claimed in claim 1, wherein the method further comprises the step of applying the mix on a core comprising a wood fibre based board.

7. The method as claimed in claim 6, wherein the wood fibre based board is HDF.

8. The method as claimed in claim 6, wherein the wood fibre based board is a particleboard.

9. The method as claimed in claim 1, wherein the method further comprises a pre pressing prior to the final pressing.

10. The method as claimed in claim 1, wherein the method further comprises a printing operation prior to the final pressing.

11. The method as claimed in claim 1, wherein the method comprises a machining operation comprising forming the building panel to a floor panel with mechanical locking systems at opposite edges.

12. A method as claimed in claim 1, wherein the method further comprises the steps of:
    arranging the mix on a core layer comprising wood fibres and a binder;
    arranging said core layer on a balancing layer comprising wood fibres and a binder; and
    applying heat and pressure to the three layers comprising the mix, the core and the balancing layer.

13. The method as claimed in claim 12 wherein the balancing layer has a higher density than the core layer.

14. The method as claimed in claim 12, wherein the binder is a thermosetting resin and the wear resistant particles comprise aluminium oxide.

15. The method as claimed in claim 1, wherein the wood fibres, the binder, and the wear resistant particles are in dry form.

16. The method as claimed in claim 1, wherein the mix is in powder form.

17. The method as claimed in claim 1, wherein the step of mixing comprises mixing the mix into a homogenous mix.

18. The method as claimed in claim 1, wherein the mix further comprises colour pigments.

19. The method as claimed in claim 6, wherein the mix forms a surface layer on said core.

20. The method as claimed in claim 10, wherein the printing operation is performed by an ink jet printer.

21. The method as claimed in claim 1, wherein the wood fibres are in powder form.

22. A method of manufacturing a building panel comprising the steps of:
    mixing wood fibres with a binder and wear resistant particles into a mix,
    applying the mix on a core, and
    bringing the mix, including the fibres, the binder and the wear resistant particles, under heat and pressure, thereby the mix forms a surface layer on the core.

23. A method of manufacturing a building panel comprising the steps of:
    mechanically mixing fibres with a binder and wear resistant particles into a mix, and
    bringing the mix, including the fibres, the binder and the wear resistant particles, under heat and pressure, thereby forming a building panel.

* * * * *